(12) United States Patent
Nonogaki

(10) Patent No.: US 10,430,268 B2
(45) Date of Patent: Oct. 1, 2019

(54) OPERATIONS MANAGEMENT SYSTEM, OPERATIONS MANAGEMENT METHOD AND PROGRAM THEREOF

(71) Applicant: NEC Corporation, Tokyo (JP)

(72) Inventor: Yosuke Nonogaki, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 15 days.

(21) Appl. No.: 15/208,457

(22) Filed: Jul. 12, 2016

(65) Prior Publication Data
US 2016/0321128 A1 Nov. 3, 2016

Related U.S. Application Data

(63) Continuation of application No. 13/695,776, filed as application No. PCT/JP2012/058033 on Mar. 21, 2012, now Pat. No. 9,417,940.

(30) Foreign Application Priority Data

Mar. 23, 2011 (JP) ................. 2011-064603

(51) Int. Cl.
*G06F 11/07* (2006.01)
*G06F 11/36* (2006.01)
*G06F 11/34* (2006.01)

(52) U.S. Cl.
CPC ........ *G06F 11/079* (2013.01); *G06F 11/0709* (2013.01); *G06F 11/0754* (2013.01);
(Continued)

(58) Field of Classification Search
CPC ............ G06F 11/3688; G06F 11/3409; G06F 11/3447; G06F 2201/81
See application file for complete search history.

(56) References Cited

U.S. PATENT DOCUMENTS

2005/0075874 A1* 4/2005 Balchandran ....... G06F 17/2715
704/231
2005/0268147 A1* 12/2005 Yamamoto ............ G06F 3/0617
714/2
(Continued)

FOREIGN PATENT DOCUMENTS

CN 101211289 A 7/2008
EP 1 895 416 A1 3/2008
(Continued)

OTHER PUBLICATIONS

Extended European Search Report dated Oct. 26, 2016.
(Continued)

*Primary Examiner* — Jigar P Patel
(74) *Attorney, Agent, or Firm* — McGinn I.P. Law Group, PLLC.

(57) ABSTRACT

An operations management system, including a memory configured to store program instructions and a plurality of analytical models respectively used for detection of anomaly in a plurality of targets, and a processor configured to execute the program instructions including an order controller configured to control an processing order of the detection of anomaly performed by the operation management system to be the same as a descending order of score of anomaly of the plurality of targets, and an analyzer configured to detect, in the processing order, anomaly in each of the plurality of targets.

11 Claims, 25 Drawing Sheets

(52) U.S. Cl.
CPC ...... *G06F 11/3688* (2013.01); *G06F 11/3409* (2013.01); *G06F 11/3447* (2013.01)

(56) References Cited

U.S. PATENT DOCUMENTS

| | | |
|---|---|---|
| 2005/0289404 A1 | 12/2005 | Maguire |
| 2008/0010330 A1* | 1/2008 | Ide ................. G05B 23/024 708/201 |
| 2008/0016412 A1 | 1/2008 | White et al. |
| 2009/0055339 A1* | 2/2009 | Bernard ............ G05B 23/0283 706/46 |
| 2009/0216624 A1* | 8/2009 | Kato .................. G06F 11/3409 705/7.38 |
| 2009/0217099 A1* | 8/2009 | Kato .................. G06F 11/3409 714/37 |
| 2010/0205483 A1 | 8/2010 | Ishiou |
| 2011/0161743 A1 | 6/2011 | Kato |
| 2011/0225462 A1 | 9/2011 | Kato |
| 2012/0192014 A1 | 7/2012 | Kato |

FOREIGN PATENT DOCUMENTS

| | | |
|---|---|---|
| JP | 2009-199533 A | 9/2009 |
| JP | 2010-231292 A | 10/2010 |
| WO | WO 2010/032701 A1 | 3/2010 |

OTHER PUBLICATIONS

Schwarz, J., "Correlation coefficients according to Bravais-Pearson, Spearman, and Kendall", Laboratory Automation and Information Management, Elsevier BV, NL, vol. 5, No. 3, May 1, 1987 (May 1, 1987), pp. 114-126, XP008181714, ISSN: 0889-8308.
United States Office Action dated Aug. 19, 2014 in U.S. Appl. No. 13/695,776.
United States Office Action dated Mar. 10, 2015 in U.S. Appl. No. 13/695,776.
United States Office Action dated Jun. 25, 2015 in U.S. Appl. No. 13/695,776.
United States Office Action dated Jan. 4, 2016 in U.S. Appl. No. 13/695,776.
Chinese Office Action dated Jul. 2, 2015 with an English translation thereof.
Extended European Search Report dated Jul. 9, 2015.
International Search Report in PCT/JP2012/058033 dated May 29, 2012 (English translation therof).

* cited by examiner

Fig.5

| TIME | SV1.CPU | SV1.MEM | SV1.DSK | SV2.CPU | ... |
|---|---|---|---|---|---|
| 2010/2/1 10:00 | 15 | 79 | 50 | 32 | ... |
| 2010/2/1 10:05 | 18 | 51 | 25 | 32 | ... |
| 2010/2/1 10:10 | 22 | 51 | 25 | 35 | ... |
| 2010/2/1 10:15 | 20 | 81 | 50 | 50 | ... |
| .. | .. | .. | .. | .. | .. |

| TIME | 2010/3/1 10:00 |
|---|---|

| INPUT | OUTPUT | RESULT OF CORRELATION DESTRUCTION DETECTION |
|---|---|---|
| SV1.CPU | SV1.MEM | ○ |
| SV1.CPU | SV1.DSK | ○ |
| SV1.CPU | SV2.CPU | ○ |
| SV1.CPU | SV3.CPU | ○ |
| SV1.MEM | SV1.DSK | ○ |
| SV1.DSK | SV2.CPU | × |
| SV2.CPU | SV1.MEM | × |
| SV2.CPU | SV2.MEM | × |
| SV2.CPU | SV3.CPU | × |
| SV2.MEM | SV1.MEM | × |

Fig.8

| FAULT IDENTIFIER | 1 |
|---|---|

| INPUT | OUTPUT | RESULT OF CORRELATION DESTRUCTION DETECTION |
|---|---|---|
| SV1.CPU | SV1.MEM | ○ |
| SV1.CPU | SV1.DSK | ○ |
| SV1.CPU | SV2.CPU | ○ |
| SV1.CPU | SV3.CPU | × |
| SV1.MEM | SV1.DSK | ○ |
| SV1.DSK | SV2.CPU | × |
| SV2.CPU | SV1.MEM | ○ |
| SV2.CPU | SV2.MEM | × |
| SV2.CPU | SV3.CPU | × |
| SV2.MEM | SV1.MEM | × |

Fig.9

| INPUT | OUTPUT | RESULT OF CORRELATION DESTRUCTION DETECTION FROM CORRELATION DESTRUCTION DETECTION UNIT 301 | RESULT OF CORRELATION DESTRUCTION DETECTION IN CORRELATION DESTRUCTION PATTERN 224 |
|---|---|---|---|
| SV1.CPU | SV1.MEM | ○ | ○ |
| SV1.CPU | SV1.DSK | ○ | ○ |
| SV1.CPU | SV2.CPU | ○ | ○ |
| SV1.CPU | SV3.CPU | ○ | × |
| SV1.MEM | SV1.DSK | ○ | ○ |
| SV1.DSK | SV2.CPU | × | × |
| SV2.CPU | SV1.MEM | × | ○ |
| SV2.CPU | SV2.MEM | × | × |
| SV2.CPU | SV3.CPU | × | × |
| SV2.MEM | SV1.MEM | × | × |

DEGREE OF CORRELATION DESTRUCTION = 5
(NUMBER OF CORRELATION DESTRUCTION)

DEGREE OF SIGNALING FAULT = 80%
(NUMBER OF COINCIDENCE BETWEEN RESULTS OF WHETHER CORRELATION DESTRUCTION IS DETECTED OR NOT / NUMBER OF CORRELATIONS)

| SYSTEM IDENTIFIER | DEGREE OF ABNORMALITY | |
|---|---|---|
| | DEGREE OF CORRELATION DESTRUCTION | DEGREE OF SIGNALING FAULT |
| S1 | 256 | 67 |
| S2 | 32 | 9 |
| S3 | 64 | 25 |
| S4 | 128 | 7 |

AFTER EXPIRATION OF TIME PERIOD 1

| | CALCULATION OF SCORE | | | | | DETECTION ORDER |
|---|---|---|---|---|---|---|
| SYSTEM IDENTIFIER | DEGREE OF CORRELATION DESTRUCTION | SCORE | DEGREE OF SIGNALING FAULT | SCORE | TOTAL SCORE | |
| S1 | 256 | +4 | 67 | +4 | 8 | 1 |
| S2 | 32 | +1 | 9 | +2 | 3 | 4 |
| S3 | 64 | +2 | 25 | +3 | 5 | 2 |
| S4 | 128 | +3 | 7 | +1 | 4 | 3 |

Fig.19

AFTER EXPIRATION OF TIME PERIOD 1

| SYSTEM IDENTIFIER | DEGREE OF ABNORMALITY | | UNANALYZED TIMES | CALCULATION OF SCORE | | | | | |
|---|---|---|---|---|---|---|---|---|---|
| | DEGREE OF CORRELATION DESTRUCTION | DEGREE OF SIGNALING FAULT | | DEGREE OF CORRELATION DESTRUCTION | SCORE | DEGREE OF SIGNALING FAULT | SCORE | TOTAL SCORE | DETECTION ORDER |
| S1 | 64 | 50 | 0 | 64 | +4 | 50 | +4 | 8 | 1 |
| S2 | 20 | 25 | 0 | 20 | +3 | 25 | +3 | 6 | 2 |
| S3 | 16 | 14 | 1 | 16×1=16 | +2 | 14×1=14 | +2 | 4 | 3 |
| S4 | 8 | 12 | 1 | 8×1=8 | +1 | 12×1=12 | +1 | 2 | 4 |

Fig.20

AFTER EXPIRATION OF TIME PERIOD 2

| SYSTEM IDENTIFIER | DEGREE OF ABNORMALITY | | UNANALYZED TIMES | CALCULATION OF SCORE | | | | TOTAL SCORE | DETECTION ORDER |
|---|---|---|---|---|---|---|---|---|---|
| | DEGREE OF CORRELATION DESTRUCTION | DEGREE OF SIGNALING FAULT | | DEGREE OF CORRELATION DESTRUCTION | SCORE | DEGREE OF SIGNALING FAULT | SCORE | | |
| S1 | 65 | 51 | 0 | 65 | +4 | 51 | +4 | 8 | 1 |
| S2 | 19 | 26 | 0 | 19 | +2 | 26 | +2 | 4 | 2 |
| S3 | 16 | 14 | 2 | 16×2=32 | +3 | 14×2=28 | +3 | 6 | 3 |
| S4 | 8 | 12 | 2 | 8×2=16 | +1 | 12×2=24 | +1 | 2 | 4 |

Fig.21

AFTER EXPIRATION OF TIME PERIOD 3

| | DEGREE OF ABNORMALITY | | UNANALYZED TIMES | CALCULATION OF SCORE | | | | | |
|---|---|---|---|---|---|---|---|---|---|
| SYSTEM IDENTIFIER | DEGREE OF CORRELATION DESTRUCTION | DEGREE OF SIGNALING FAULT | | DEGREE OF CORRELATION DESTRUCTION | SCORE | DEGREE OF SIGNALING FAULT | SCORE | TOTAL SCORE | DETECTION ORDER |
| S1 | 66 | 52 | 0 | 66 | +4 | 52 | +4 | 8 | 1 |
| S2 | 20 | 27 | 0 | 20 | +2 | 27 | +2 | 4 | 2 |
| S3 | 15 | 13 | 0 | 15 | +1 | 13 | +1 | 2 | 4 |
| S4 | 8 | 12 | 3 | 8×3=24 | +3 | 12×3=36 | +3 | 6 | 2 |

Fig.23

AFTER EXPIRATION OF TIME PERIOD 1

| | DEGREE OF ABNORMALITY | | UNANALYZED TIMES | CALCULATION OF SCORE | | | | | DETECTION ORDER |
|---|---|---|---|---|---|---|---|---|---|
| SYSTEM IDENTIFIER | DEGREE OF CORRELATION DESTRUCTION | DEGREE OF SIGNALING FAULT | | DEGREE OF CORRELATION DESTRUCTION | SCORE | DEGREE OF SIGNALING FAULT | SCORE | TOTAL SCORE | |
| S1 | 64 | 50 | 0 | 64 | +3 | 50 | +3 | 6 | 1 |
| S2 | 20 | 25 | 0 | 20 | +1 | 25 | +1 | 2 | 4 |
| S3 | 16 | 14 | 1 | 16+8 =24 | +2 | 14+12 =26 | +2 | 4 | 2 |
| S4 | 8 | 12 | 1 | | | | | | 3 |

Fig.24

AFTER EXPIRATION OF TIME PERIOD 2

| SYSTEM IDENTIFIER | DEGREE OF ABNORMALITY | | UNANALYZED TIMES | CALCULATION OF SCORE | | | | TOTAL SCORE | DETECTION ORDER |
|---|---|---|---|---|---|---|---|---|---|
| | DEGREE OF CORRELATION DESTRUCTION | DEGREE OF SIGNALING FAULT | | DEGREE OF CORRELATION DESTRUCTION | SCORE | DEGREE OF SIGNALING FAULT | SCORE | | |
| S1 | 65 | 51 | 0 | 65 | +3 | 51 | +3 | 6 | 1 |
| S2 | 20 | 25 | 1 | 20 | +1 | 25 | +1 | 2 | 4 |
| S3 | 16 | 14 | 2 | 16+8=24 | +2 | 14+12=26 | +2 | 4 | 2 |
| S4 | 8 | 12 | 2 | | | | | | 3 |

Fig.25

AFTER EXPIRATION OF TIME PERIOD 3

| SYSTEM IDENTIFIER | DEGREE OF ABNORMALITY | | UNANALYZED TIMES | CALCULATION OF SCORE | | | | | |
|---|---|---|---|---|---|---|---|---|---|
| | DEGREE OF CORRELATION DESTRUCTION | DEGREE OF SIGNALING FAULT | | DEGREE OF CORRELATION DESTRUCTION | SCORE | DEGREE OF SIGNALING FAULT | SCORE | TOTAL SCORE | DETECTION ORDER |
| S1 | 66 | 52 | 0 | 66 | +4 | 52 | +4 | 8 | 1 |
| S2 | 20 | 25 | 2 | 20 | +3 | 27 | +3 | 6 | 2 |
| S3 | 15 | 13 | 0 | 15 | +2 | 13 | +2 | 4 | 3 |
| S4 | 9 | 11 | 0 | 9 | +1 | 11 | +1 | 2 | 4 |

OPERATIONS MANAGEMENT SYSTEM, OPERATIONS MANAGEMENT METHOD AND PROGRAM THEREOF

CROSS-REFERENCE TO RELATED APPLICATIONS

The present application is a Continuation Application of U.S. patent application Ser. No. 13/695,776, filed on Nov. 1, 2012, which is based on International Patent Application No. PCT/JP2012/058033 filed on Mar. 21, 2012, which is based on Japanese Patent Application 2011-064603 filed on Mar. 23, 2011, the entire contents of which are hereby incorporated by reference.

TECHNICAL FIELD

The present invention relates to an operations management system, an operations management method and a program thereof, and in particular, relates to an operations management system, an operations management method and a program thereof which detects a fault of a system.

BACKGROUND ART

An example of an operations management system, which detects a fault of a system through generating a system model from time-domain sequential information on system performance and using the generated system model, is disclosed in a patent literature 1.

According to the operations management system disclosed in the patent literature 1, on the basis of measured values of plural types of performance values on the system, a correlation function for each pair of the plural types is determined, and then a correlation model including a plurality of the determined correlation functions is generated. Then, the operations managing system judges, by use of the generated correlation model, whether correlation destruction is caused in measured performance values inputted newly, and identifies a cause of the fault through detecting the performance type which causes the converged correlation destruction. As mentioned above, the art to analyze the cause of the fault on the basis of the correlation destruction is called invariant analysis.

Since the invariant analysis focuses on not largeness of the performance value but the correlation between the performance values, the invariant analysis has advantages that it is unnecessary to set a threshold value, and it is possible to detect the fault which cannot be detected by use of the threshold, and it is easy to identify the abnormal cause, etc. in comparison with a case of detecting the fault through comparing each performance value with a threshold value.

In the case that the invariant analysis is carried out for a plurality of analyzed systems, for example, for several tens analyzed systems all over the country, investment cost increases if an analysis apparatus, which carries out the invariant analysis, is arranged in every analyzed system.

Then, a method that one analysis apparatus, which is arranged in a data center or the like managing the systems all over the country and which works for a plurality of the analyzed systems, carries out the invariant analysis for each of the plural analyzed systems, sequentially, is conceived.

CITATION LIST

Patent Literature

[Patent Literature 1] Japanese Patent Application Laid-Open No. 2009-199533

SUMMARY OF INVENTION

Technical Problem

However, in the case that one analysis apparatus carries out the invariant analysis described in the patent literature 1, for each of the plural analyzed systems, sequentially, there is a problem that it is delayed to detect the fault of the system whose analysis order is scheduled latterly and consequently it is impossible to inform and to execute a countermeasure suitably.

For example, in the case that it takes several seconds to carry out the invariant analysis for each analyzed system since each analyzed system includes a large number of servers, it takes several minutes to detect the fault of the system, whose analysis order is scheduled latterly, when the invariant analysis is applied to several tens analyzed systems.

An object of the present invention is to provide an operations management system, an operations management method and a program thereof which are able to decrease the delay in detecting the fault, in the invariant analysis applied to a plurality of the analyzed systems.

Solution to Problem

An operations management system according to an exemplary aspect of the invention includes correlation model storing means for storing a correlation model which indicates a correlation among plural types of performance values, for each of plural systems, analysis order storing means for storing a detection order in the plural systems for carrying out detection of correlation destruction, analysis means for carrying out, in each of plural time periods, detection of whether the correlation destruction of the correlation included in the correlation model of each of the plural systems is caused or not by use of performance values inputted for the each of plural time periods, on the basis of the detection order, and order control means for updating the detection order in the each of plural time periods.

An operations management method according to an exemplary aspect of the invention includes storing a correlation model which indicates a correlation among plural types of performance values, for each of plural systems, storing a detection order in the plural systems for carrying out detection of correlation destruction, carrying out, in each of plural time periods, detection of whether the correlation destruction of the correlation included in the correlation model of each of the plural systems is caused or not by use of performance values inputted for the each of plural time periods, on the basis of the detection order, and updating the detection order in the each of plural time periods.

A computer readable storage medium according to an exemplary aspect of the invention, records thereon a program, causing a computer to perform a method including storing a correlation model which indicates a correlation among plural types of performance values, for each of plural systems, storing a detection order in the plural systems for carrying out detection of correlation destruction, carrying out, in each of plural time periods, detection of whether the correlation destruction of the correlation included in the correlation model of each of the plural systems is caused or not by use of performance values inputted for the each of plural time periods, on the basis of the detection order, and updating the detection order in the each of plural time periods.

Advantageous Effect of Invention

An effect of the present invention is that it is possible to decrease the delay in detecting the fault, in the invariant analysis applied to a plurality of the analyzed systems.

BRIEF DESCRIPTION OF DRAWINGS

FIG. 5 A diagram showing an example of performance sequence information 221 according to the first exemplary embodiment of the present invention.

FIG. 7 A diagram showing an example of correlation destruction information 223 according to the first exemplary embodiment of the present invention.

FIG. 8 A diagram showing an example of a correlation destruction pattern 224 according to the first exemplary embodiment of the present invention.

FIG. 9 A diagram showing an example of calculating a degree of abnormality according to the first exemplary embodiment of the present invention.

FIG. 13 A diagram showing an example of calculating a detection order according to the first exemplary embodiment of the present invention.

FIG. 19 A diagram showing an example of calculating a detection order according to the second exemplary embodiment of the present invention.

FIG. 20 A diagram showing an example of calculating the detection order according to the second exemplary embodiment of the present invention.

FIG. 21 A diagram showing an example of calculating the detection order according to the second exemplary embodiment of the present invention.

FIG. 23 A diagram showing an example of calculating a detection order according to the third exemplary embodiment of the present invention.

FIG. 24 A diagram showing an example of calculating the detection order according to the third exemplary embodiment of the present invention.

FIG. 25 A diagram showing an example of calculating the detection order according to the third exemplary embodiment of the present invention.

DESCRIPTION OF EMBODIMENTS (First Exemplary Embodiment)

Next, a first exemplary embodiment according to the present invention will be described.

Figure 2:
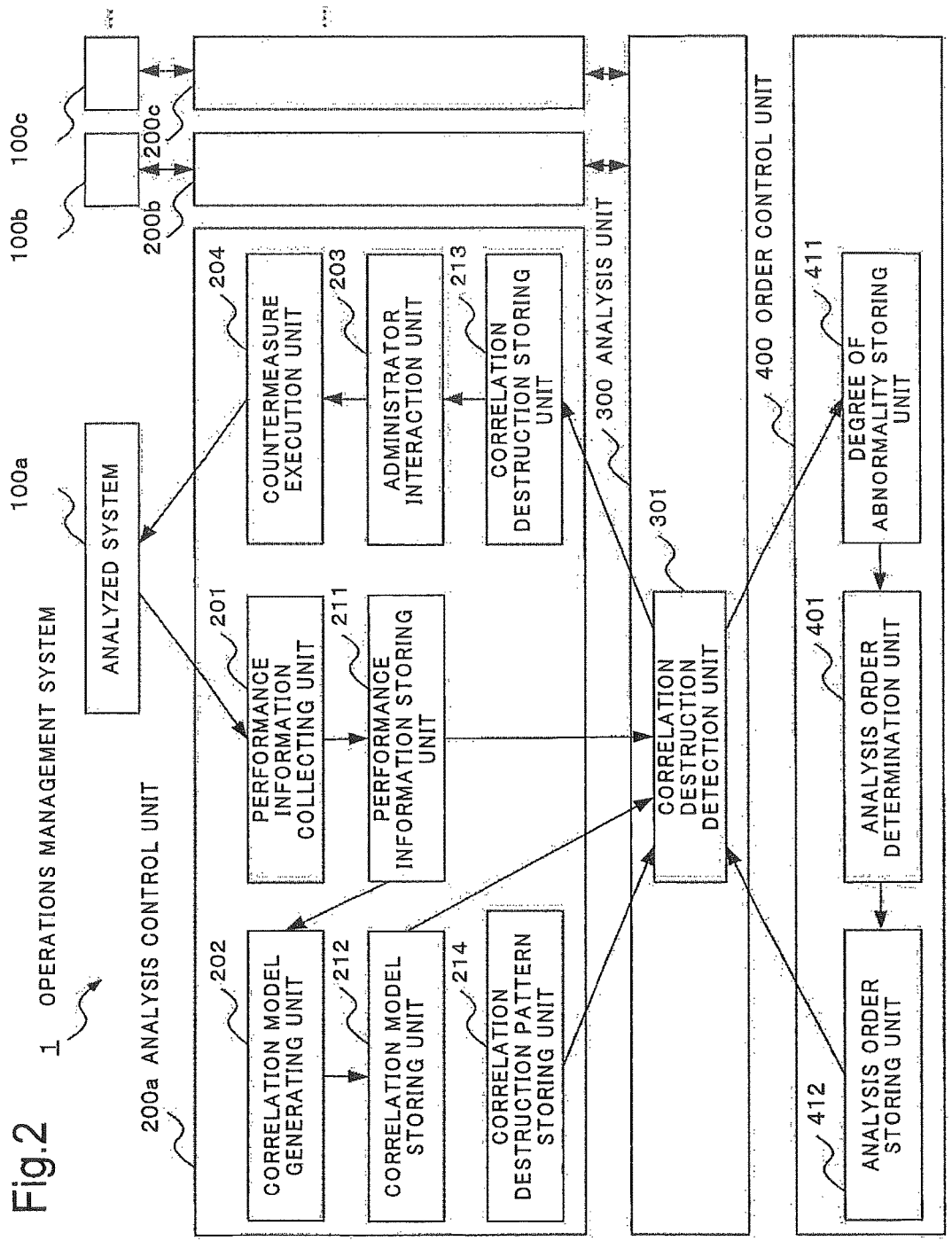
FIG. 2 A block diagram showing a configuration of an operations management system 1 according to the first exemplary embodiment of the present invention.

Firstly, a configuration according to the first exemplary embodiment of the present invention will be described. FIG. 2 is a block diagram showing a configuration of an operations management system 1 according to the first exemplary embodiment of the present invention.

With reference to FIG. 2, the operations management system 1 according to the first exemplary embodiment of the present invention includes a plurality of analyzed systems 100 (100a, 100b, 100c . . . ), a plurality of analysis control units 200 (200a, 200b and 200c . . . ), an analysis unit 300 and an order control unit 400.

The analyzed system 100 includes one or more monitored apparatuses, such as a Web server, an application server and a database server, which compose the analyzed system.

The analysis control units 200 are connected with analyzed systems 100, respectively. The analysis control unit 200 generates a correlation model 222 on the analyzed system 100. Moreover, the analysis control unit 200 outputs an analysis result to a user and executes a countermeasure against a detected fault.

The analysis control unit 200 includes a performance information collecting unit 201, a correlation model generating unit 202, an administrator interaction unit 203, a countermeasure execution unit 204, a performance information storing unit 211, a correlation model storing unit 212, a correlation destruction storing unit 213 and a correlation destruction pattern storing unit 214.

Here, the performance information collecting unit 201 collects, from each monitored apparatus included in the analyzed system 100, measured data (measured values) of performance values of plural items measured in the monitored apparatus at a predetermined time interval. As the item of the performance value, for example, a rate of using CPU (Central Processing Unit) (abbreviated as CPU), an amount of used memory (abbreviated as MEM), an amount of used disk (abbreviated as DSK) or the like is collected. Here, a set of the monitored apparatus and the item of the performance value is defined as a type of the performance value (performance type (or abbreviated as type)), and a set of the plural types of the performance values measured at the same time is defined as performance information. The performance information collecting unit 201 makes the performance information storing unit 211 store a time-domain sequential change of the performance information as performance sequence information 221.

FIG. 5 is a diagram showing an example of the performance sequence information 221 according to the first exemplary embodiment of the present invention. According to the example in FIG. 5, the performance sequence information 221 includes a rate of using CPU (SV1.CPU), an amount of used memory (SV1.MEM), and an amount of used disk (SV1.DSK) of the monitored apparatus with apparatus identifier SV1, a rate of using CPU (SV2.CPU) of the monitored apparatus 200 with apparatus identifier SV2, or the like as the performance type.

The correlation model generating unit 202 generates the correlation model 222 of the analyzed system 100 on the basis of the performance sequence information 221. Here, the correlation model generating unit 202 determines a correlation function (conversion function), which indicates a correlation for a pair of performance types out of the plural performance types, on the basis of the performance information collected at a predetermined time interval, which is included in the performance sequence information 221, and generates the correlation model 222 which is a set of the determined correlation functions. The correlation function estimates, on the basis of a time-domain sequence of measured values of one performance type, a time-domain sequence of performance values of another performance type. The correlation function is determined in the system identifying process, which is applied to the time-domain sequences of the measured values of a pair of performance types, as shown in the patent literature 1. The correlation model generating unit 202 may calculate a weight for each correlation function on the basis of an average value of a conversion error which is caused by the correlation function. Here, the weight becomes small as an average value of the conversion error becomes large. Then, the correlation model generating unit 202 may make the correlation model 222 include only the correlation function which has the weight larger than a predetermined value.

The correlation model storing unit 212 stores the correlation model 222 generated by the correlation model generating unit 202.

Figure 6:
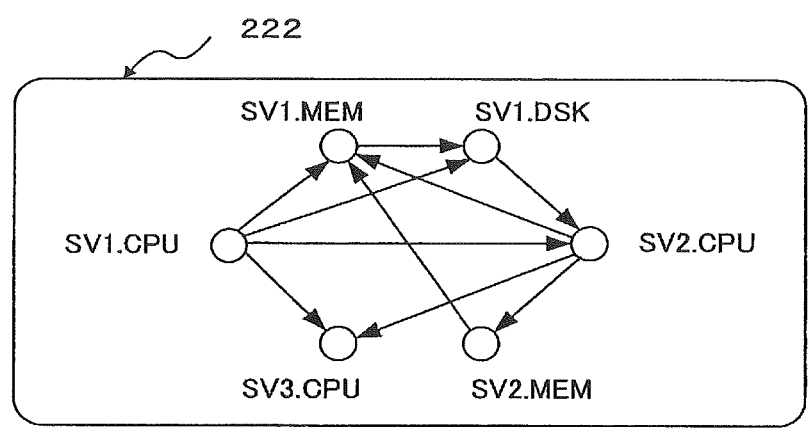
FIG. 6 A diagram showing an example of a correlation model 222 according to the first exemplary embodiment of the present invention.

FIG. 6 is a diagram showing an example of the correlation model 222 according to the first exemplary embodiment of the present invention. In FIG. 6, each node means the performance type, and an arrow indicated by a solid line between the nodes means the correlation from one to the other out of two performance types. The correlation function (not shown in the figure) is determined for each of these correlations.

The correlation destruction storing unit 213 stores correlation destruction information 223 which is a result of correlation destruction detection in the correlation model 222 and which is acquired from the analysis unit 300.

FIG. 7 is a diagram showing an example of the correlation destruction information 223 according to the first exemplary embodiment of the present invention. The correlation destruction information 223 is generated every measurement time of the performance information, and includes the measurement time of the performance information which is a target for the correlation destruction detection, the correlation (input and output) which is included in the correlation model 222, and a correlation destruction detection result per each correlation. In the correlation destruction detection result, "o" means that the correlation destruction is not caused, and "x" means that the correlation destruction is caused. FIG. 7 shows an example of the result of the correlation destruction detection for the correlation model 222 shown in FIG. 6.

The correlation destruction pattern storing unit 214 stores a correlation destruction pattern 224 which is used for calculating a degree of signaling fault in the analysis unit 300.

FIG. 8 is a diagram showing an example of the correlation destruction pattern 224 according to the first exemplary embodiment of the present invention. As shown in FIG. 8, the correlation destruction pattern 224 includes one or more sets of an identifier assigned to a past fault (fault identifier), and a list of the correlation destruction detection result for each correlation when the fault was caused. FIG. 8 shows the example of the correlation destruction pattern 224 for the correlation model 222 shown in FIG. 6.

The administrator interaction unit 203 informs an administrator or the like of the correlation destruction detection result which is acquired from the analysis unit 300, and receives an instruction, which the administrator issues, such as a countermeasure against the fault.

The countermeasure execution unit 204 executes the countermeasure, which is instructed by the administrator, on the analyzed system 100.

The analysis unit 300 is connected with a plurality of analysis control units 200 (200a, 200b, . . . ), and carries out detection of the correlation destruction on the correlation in the correlation model 222 of each of the plural analyzed systems 100 (100a, 100b, . . . ).

The analysis unit 300 includes a correlation destruction detection unit 301.

The correlation destruction detection unit 301 carries out the detection of the correlation destruction on the correlation included in the correlation model 222 of each of the plural analyzed systems 100, in each of plural time periods which are continuous in the time domain. In each time period, the correlation destruction detection unit 301 acquires the performance information to be analyzed, from the performance information storing unit 211 of the analysis control unit 200, and carries out the correlation destruction detection for the performance information, sequentially.

Here, a time length of each time period may be the same as the above-mentioned time interval for collecting the performance value. In this case, the correlation destruction detection unit 301 acquires performance information collected newly from the performance information storing unit 211 in each time period, and then, carries out the correlation destruction detection.

The correlation destruction detection unit 301, similarly to the art described in the patent literature 1, detects the correlation destruction of the correlation included in the correlation model 222, by use of the performance information to be analyzed and the correlation model 222 stored in the correlation model storing unit 212. The correlation destruction detection unit 301 calculates a difference between a value obtained through inputting a measured value of one of a pair of performance types included in the performance information to be analyzed into a correlation function related to the pair of performance types, and a measured value of the other of the pair of performance types. Then, the correlation destruction detection unit 301 judges that the correlation destruction for the pair of performance types is caused if the difference is equal to or greater than a predetermined value.

The correlation destruction detection unit 301 carries out the correlation destruction detection for each analyzed system 100 sequentially, on the basis of "order of the correlation destruction detection" in the plural analyzed systems 100, which is indicated by analysis order information 422 acquired from the order control unit 400. In the first exemplary embodiment of the present invention, it is assumed that carrying out the correlation destruction detection for all analyzed systems 100 is completed within each time period.

Furthermore, the correlation destruction detection unit 301 calculates a degree of abnormality of each analyzed system 100 on the basis of the detected correlation destruction, and sends the degree of abnormality to the order control unit 400. Here, the correlation destruction detection unit 301 calculates "a degree of correlation destruction" and "a degree of signaling fault" as the degree of abnormality.

The degree of correlation destruction indicates an extent of the correlation destruction in the correlation model 222. In the exemplary embodiment of the present invention, the number of the correlations, on which the correlation destruction is detected by the correlation destruction detection unit 301, out of the correlations included in the correlation model 222 is used as the degree of correlation destruction. In the case that the degree of correlation destruction is large, it is estimated that there is a possibility that the fault is caused in the analyzed system 100.

FIG. 9 is a diagram showing an example of calculating the degree of abnormality according to the first exemplary embodiment of the present invention. For example, in the case that, as shown in FIG. 7, correlation destruction is detected on five correlations in the correlation model 222 in FIG. 6 by the correlation destruction detection unit 301, the degree of correlation destruction is 5 as shown in FIG. 9.

The degree of correlation destruction has a tendency to become large as the number of the correlations included in the correlation model 222 of the analyzed system is large.

Here, the correlation destruction detection unit 301 may use a value calculated with another method as the degree of correlation destruction, as far as the value indicates the degree of correlation destruction. For example, the correlation destruction detection unit 301 may use a total of weights assigned to the correlations on each of which the correlation destruction is detected, as the degree of correlation destruction.

The degree of signaling fault indicates similarity (degree of similarity) between the result of the correlation destruction detection by the correlation destruction detection unit 301, and the result of the correlation destruction detection at a time when the fault was caused in the past. In the exemplary embodiment of the present invention, a degree of coincidence between a result of judging whether the correlation destruction is detected or not for each of the correlations by the correlation destruction detection unit 301, and a result of judging whether the correlation destruction is detected or not for each of the correlation in the correlation destruction pattern 224, is used as the degree of signaling fault. When the degree of coincidence is large, it is considered that there is a possibility that the same fault as the fault indicated by the correlation destruction pattern 224 is caused at this moment or will be caused in the future in the analyzed system 100.

For example, in the case that, for the correlation model 222 shown in FIG. 6, correlation destruction is detected on five correlations as shown in FIG. 7, and the correlation destruction pattern 224 is set as shown in FIG. 8, results of judging whether the correlation destruction is detected or not are coincident for 8 correlations, as shown in FIG. 9. In this case, the degree of coincidence on the result of judging whether the correlation destruction is detected or not is equal to 80% through dividing the number of the correlations for which the results of judging whether the correlation destruction is detected or not is coincident by the number of the correlations.

The degree of signaling fault has a tendency to become large as the number of the correlations included in the correlation model 222 of the analyzed system is small.

Here, the correlation destruction detection unit 301 may use a value calculated with another method as the degree of signaling fault, as far as the value indicates the similarity (degree of similarity) between the result of the correlation destruction detection by the correlation destruction detection unit 301 and the result of the correlation destruction detection at a time when the fault was caused in the past. For example, the correlation destruction detection unit 301 may find out the similarity of the correlation on which the correlation destruction is detected through comparing the correlations on each of which the correlation destruction is detected, in stead of comparing the results of judging whether the correlation destruction is detected or not, and then use the similarity as the degree of signaling fault. Moreover, the correlation destruction detection unit 301 may divide the correlations into some groups, and find out the similarity on distribution of the number of the correlations on which the correlation destruction is detected, per the group, and use the similarity as the degree of signaling fault.

The order control unit 400 is connected with the analysis unit 300. The order control unit 400 determines and updates an order of the correlation destruction detection in a plurality of the analyzed systems 100.

The order control unit 400 includes an analysis order determination unit 401, a degree of abnormality storing unit 411 and an analysis order storing unit 412.

The analysis order determination unit 401 determines the order of carrying out the correlation destruction detection in a plurality of the analyzed systems 100 on the basis of the degree of abnormality of each analyzed system 100, which is stored in the degree of abnormality storing unit 411, in each of the plural time periods mentioned above, and updates the analysis order information 422 which is stored in the analysis order storing unit 412.

Figure 10:
FIG. 10 A diagram showing an example of degree of abnormality information 421 according to the first exemplary embodiment of the present invention.

The degree of abnormality storing unit 411 stores degree of abnormality information 421 which indicates the degree of abnormality of each analyzed system 100, which is acquired from the analysis unit 300. FIG. 10 is a diagram showing an example of the degree of abnormality information 421 according to the first exemplary embodiment of the present invention. As shown in FIG. 10, the degree of abnormality information 421 includes an identifier of the analyzed system 100 (system identifier), and the degree of correlation destruction and the degree of signaling fault which are defined as the degree of abnormality of the analyzed system 100.

Figure 11:
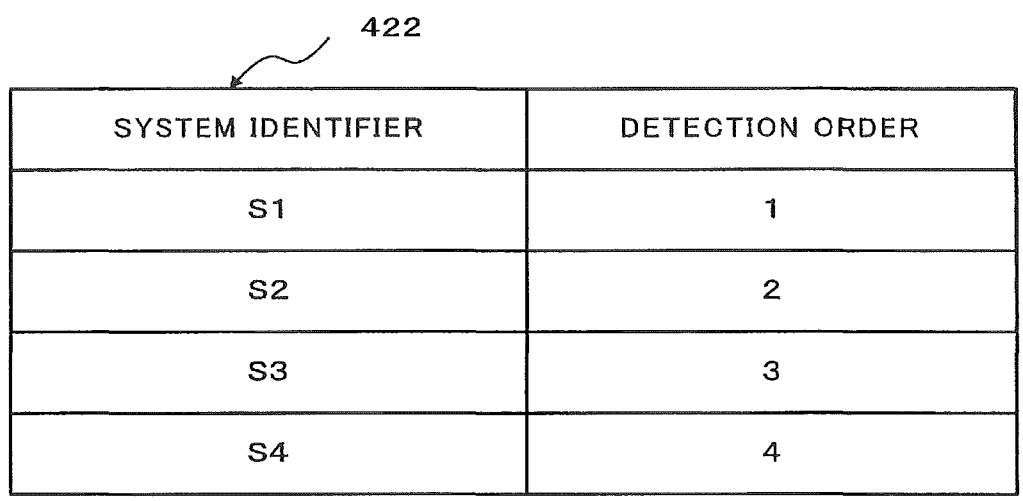
FIG. 11 A diagram showing an example of analysis order information 422 according to the first exemplary embodiment of the present invention.

The analysis order storing unit 412 stores the analysis order information 422 which indicates the order of carrying out the correlation destruction detection in the plural analyzed systems 100. Here, the order of carrying out the correlation destruction detection is determined by the analysis order determination unit 401. FIG. 11 is a diagram showing an example of the analysis order information 422 according to the first exemplary embodiment of the present invention. As shown in FIG. 11, the analysis order information 422 includes the system identifier of the analyzed system 100 and the order of carrying out the correlation destruction detection of the analyzed system 100.

Here, each of the analysis control unit 200, the analysis unit 300 and the order control unit 400 may be a computer which includes CPU and a storage medium which stores a program, and works with control based on the program.

Here, the analysis unit 300 and the order control unit 400 may be arranged in one apparatus. Moreover, the analysis control unit 200 may include the analyzed system 100.

Furthermore, a plurality of the analyzed systems 100 may be connected with one analysis control unit 200. In this case, the analysis control unit 200 generates the correlation model 222 of each of the plural analyzed systems 100 and carries out the correlation destruction detection for each of the plural analyzed systems 100. Moreover, in this case, the analysis control unit 200, the analysis unit 300 and the order control unit 400 may be arranged in one apparatus.

Next, an operation of the operations management system 1 according to the first exemplary embodiment of the present invention will be described.

Figure 3:
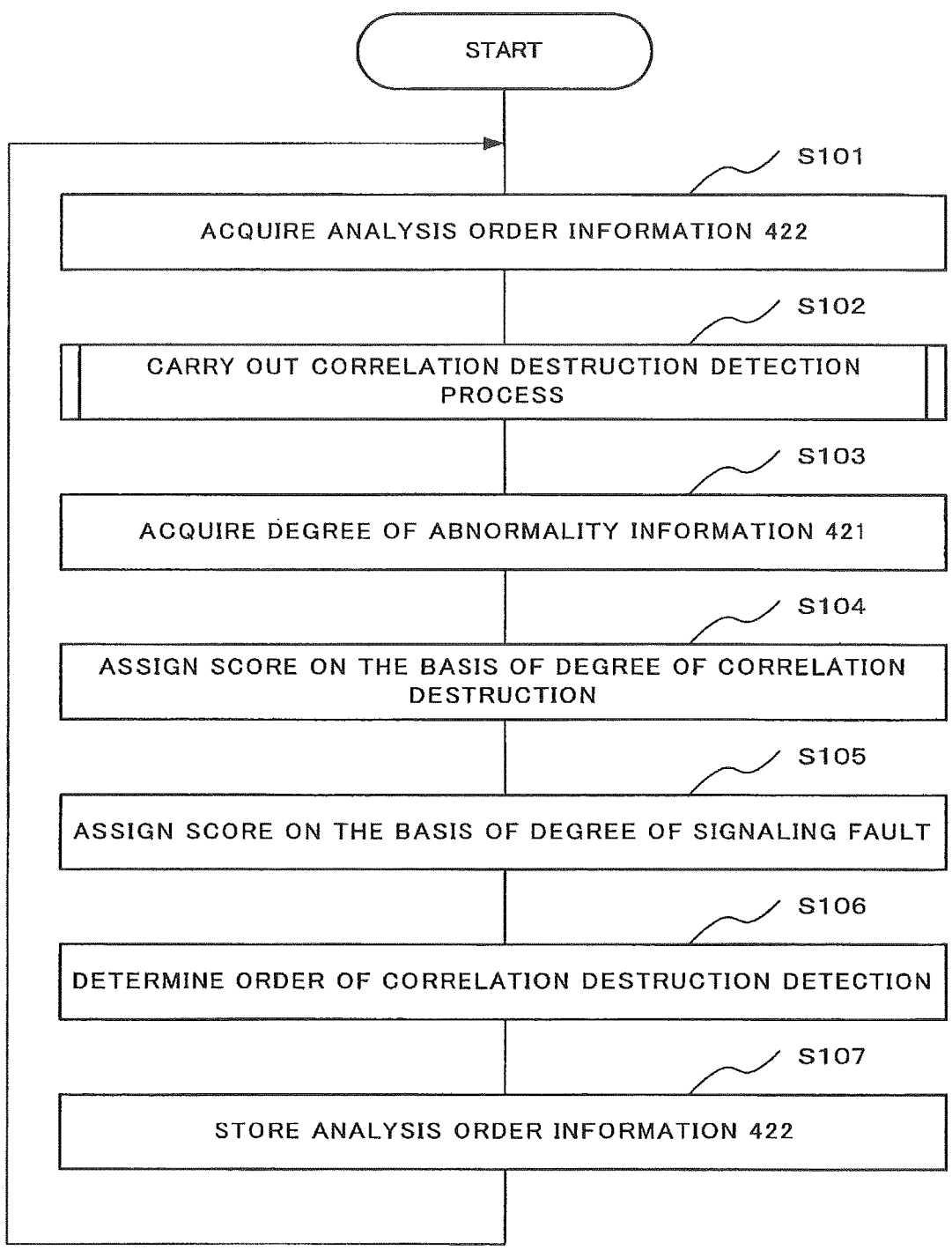
FIG. 3 A flowchart showing a process carried out by the operations management system 1 according to the first exemplary embodiment of the present invention.
Figure 12:
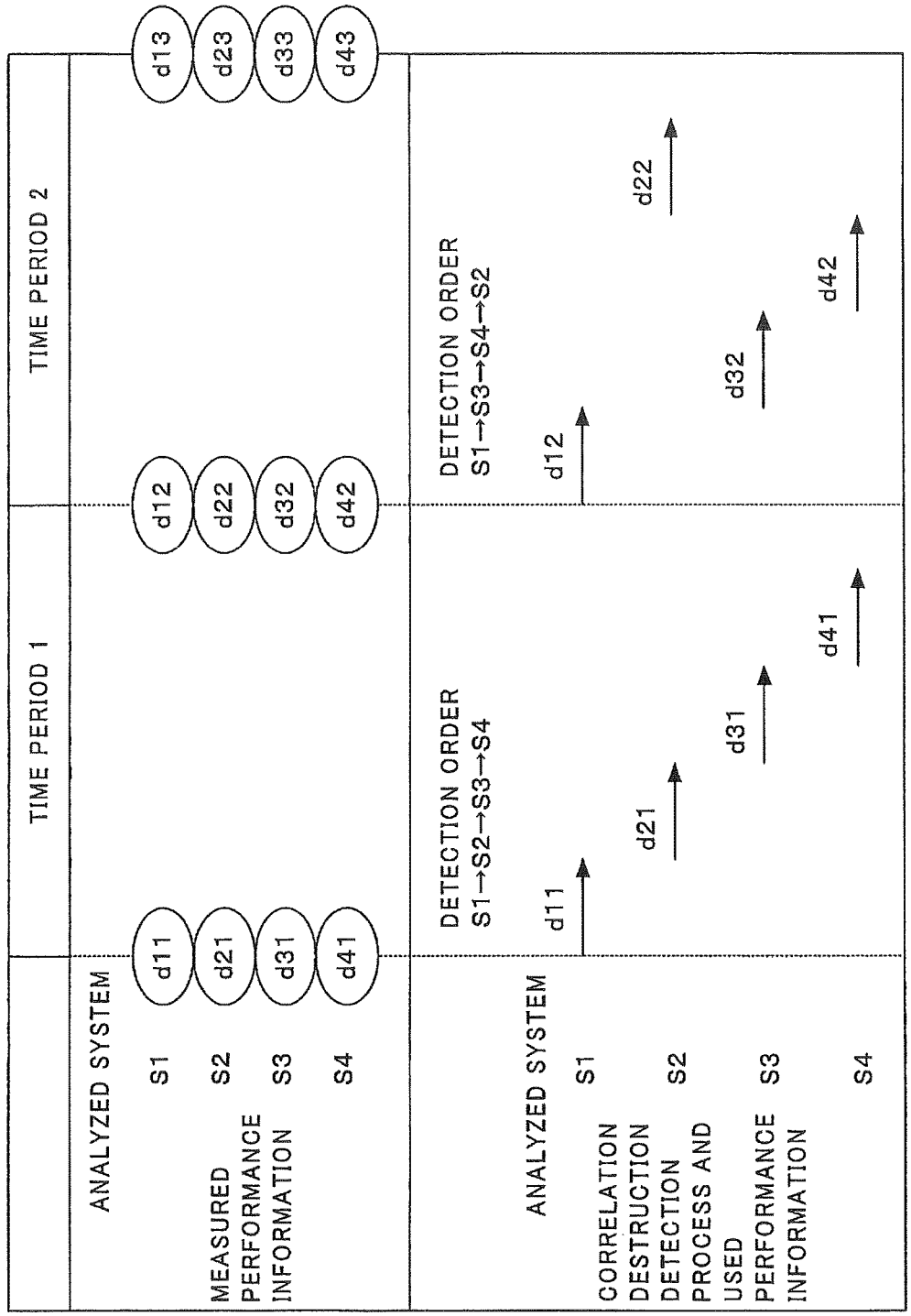
FIG. 12 A diagram showing an example of the correlation destruction detection process carried out in each time period according to the first exemplary embodiment of the present invention.

FIG. 3 is a flowchart showing a process carried out by the operations management system 1 according to the first exemplary embodiment of the present invention. FIG. 12 is a diagram showing an example of a correlation destruction detection process carried out in each time period according to the first exemplary embodiment of the present invention.

Here, it is assumed that correlation model 222 of each analyzed system 100 is generated by corresponding analysis control unit 200, and stored in the correlation model storing unit 212.

Firstly, in each of the plural time periods mentioned above, the correlation destruction detection unit 301 of the analysis unit 300 acquires analysis order information 422 from the analysis order storing unit 412 of the order control unit 400 (Step S101).

For example, the correlation destruction detection unit 301 acquires analysis order information 422 shown in FIG. 11 in time period 1 shown in FIG. 12. Here, the detection order may be determined, for example, in an ascending order of the system identifiers of the analyzed systems 100 as an initial state.

The correlation destruction detection unit 301 carries out the correlation destruction detection process on the basis of the acquired analysis order information 422 (Step S102).

Figure 4:
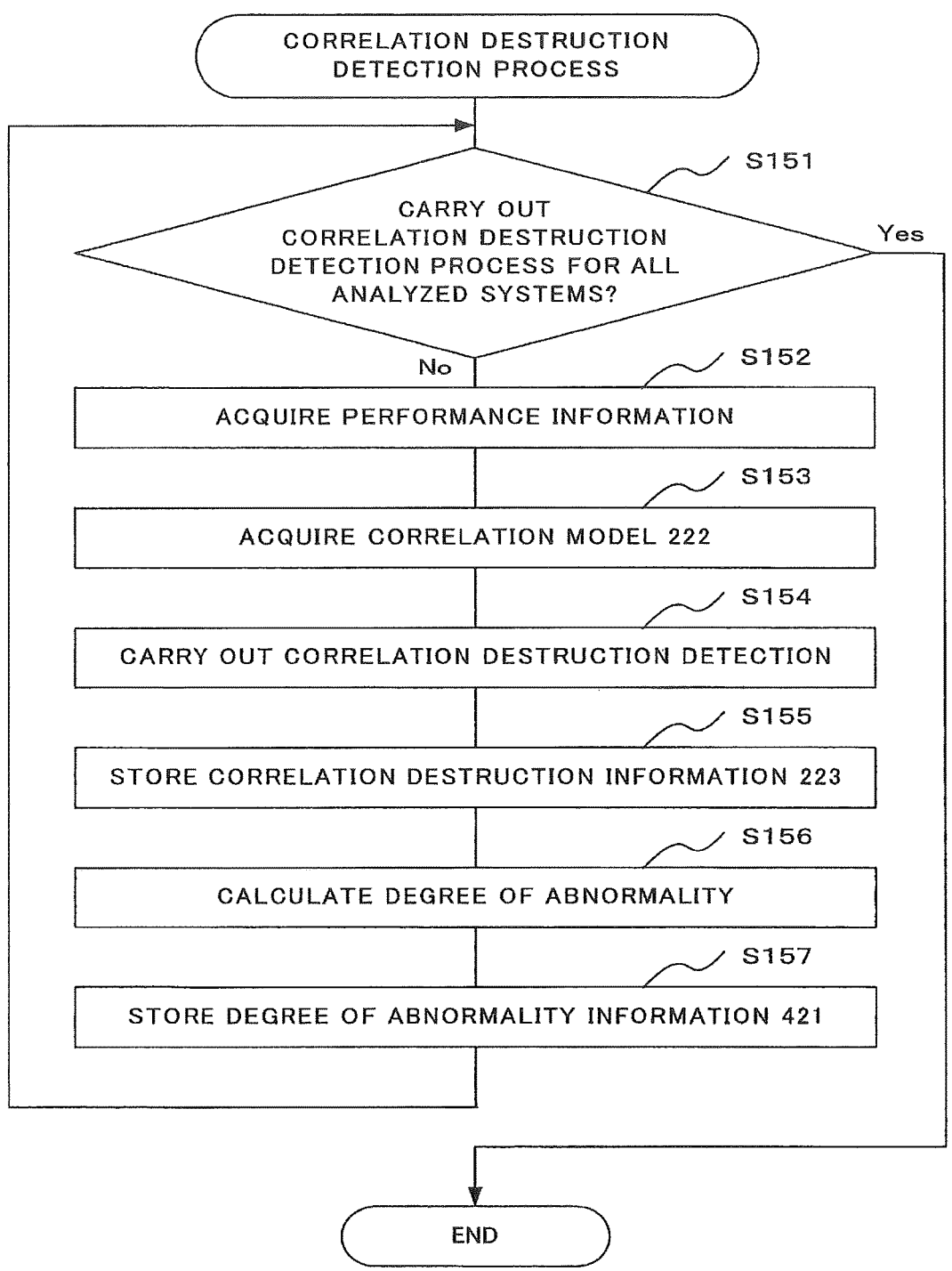
FIG. 4 A flowchart showing details of a correlation destruction detection process (Step S102) carried out by the operations management system 1 according to the first exemplary embodiment of the present invention.

FIG. 4 is a flowchart showing details of the correlation destruction detection process (Step S102) carried out by the operations management system 1 according to the first exemplary embodiment of the present invention.

The correlation destruction detection unit 301 repeats Steps S152 to S157 for each analyzed system 100, sequentially, according to the analysis order storing unit 412 (Step S151).

The correlation destruction detection unit 301 acquires performance information for the present time period, from the performance information storing unit 211 of the analysis control unit 200 (Step S152). The correlation destruction detection unit 301 acquires correlation model 222 from the correlation model storing unit 212 of the analysis control unit 200 (Step S153). The correlation destruction detection unit 301 carries out the detection of correlation destruction on the correlations included in the correlation model 222, by use of the acquired performance information and the acquired correlation model 222 (Step S154). The correlation destruction detection unit 301 stores the result of the correlation destruction detection as the correlation destruction information 223 in the correlation destruction storing unit 213 of the analysis control unit 200 (Step S155).

The correlation destruction detection unit 301 calculates degree of abnormality of the analyzed system 100 on the basis of the detected correlation destruction (Step S156). The correlation destruction detection unit 301 stores the calculated degree of abnormality as the degree of abnormality information 421 in the degree of abnormality storing unit 411 of the order control unit 400 (Step S157).

For example, in time period 1 shown in FIG. 12, the correlation destruction detection unit 301 carries out the correlation destruction detection and calculates the degree of abnormality, in an order of system identifiers S1, S2, S3 and S4 respectively, according to the analysis order information 422 shown in FIG. 11, for performance information d11, d21, d31 and d41 of time period 1 measured in respective analyzed system 100. As a result, degree of abnormality information 421, for each analyzed system 100, shown in FIG. 10 is stored in the degree of abnormality storing unit 411.

Next, the analysis order determination unit 401 of the order control unit 400 acquires the degree of abnormality information 421 from the degree of abnormality storing unit 411 (Step S103).

The analysis order determination unit 401 assigns an evaluation score (hereinafter, referred to as score), which is used for evaluating the degree of abnormality, to each analyzed system 100 on the basis of the degree of correlation destruction of each analyzed system 100 which is included in the degree of abnormality information 421 (Step S104). The analysis order determination unit 401 assigns a score to each analyzed system 100 on the basis of the degree of signaling fault of each analyzed system 100 which is included in the degree of abnormality information 421 (Step S105). Here, the analysis order determination unit 401 assigns a value, which becomes large according to an order of the degree of correlation destruction or the degree of signaling fault in all analyzed systems 100, as the score on the degree of correlation destruction or the degree of signaling fault, respectively.

FIG. 13 is a diagram showing an example of calculating the detection order according to the first exemplary embodiment of the present invention. For example, as shown in FIG. 13, the analysis order determination unit 401 assigns the scores 4, 3, 2 and 1 to the analyzed systems 100 with the system identifier S1, S4, S3 and S2, respectively, in an order of largeness of the degree of correlation destruction in four analyzed systems 100. Moreover, the analysis order determination unit 401 assigns the scores 4, 3, 2 and 1 to the analyzed systems 100 with the system identifiers S1, S3, S2 and S4, respectively, in an order of largeness of the degree of signaling fault in four analyzed systems 100.

Next, the analysis order determination unit 401 calculates a total score based on the degree of correlation destruction and the score based on the degree of signaling fault per the analyzed system 100, and determines the order of carrying out the correlation destruction detection in the plural analyzed systems 100 in such a way that the correlation destruction detection for the analyzed system 100 with the high total score is carried out early (Step S106). Then, the analysis order determination unit 401 stores the determined detection order as the analysis order information 422 in the analysis order storing unit 412 (Step S107).

For example, as shown in FIG. 13, the analysis order determination unit 401 calculates a total score per the analyzed object system 100, and determines the detection order for the analyzed systems 100 with the system identifiers S1, S3, S4 and S2 as 1, 2, 3, and 4, respectively, in an order of largess of the total score.

Figure 14:
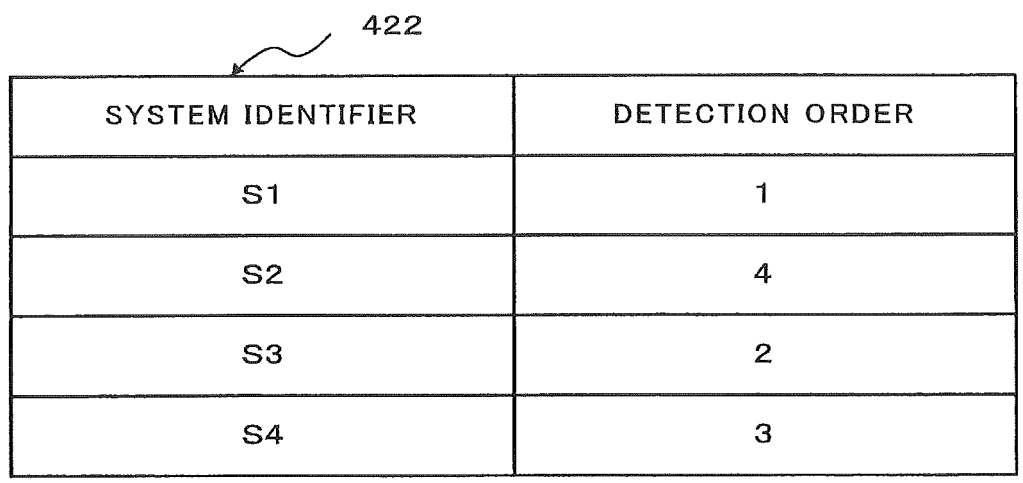
FIG. 14 A diagram showing another example of the analysis order information 422 according to the first exemplary embodiment of the present invention.

FIG. 14 is a diagram showing another example of the analysis order information 422 according to the first exemplary embodiment of the present invention. The analysis order determination unit 401 stores (updates) the analysis order information 422 shown in FIG. 14 in the analysis order storing unit 412. Here, in the case that a plurality of the analyzed systems 100 have the same total score, the analysis order determination unit 401 may determine the detection order in such a way that the detection may be carried out early for the analyzed system 100 with the large degree of correlation destruction or the large degree of signaling fault.

Then, the correlation destruction detection unit 301 and the analysis order determination unit 401 carry out Steps S101 to S107 repeatedly in each of the plural time periods. At this time, the correlation destruction detection unit 301 carries out the correlation destruction detection and calculates the degree of abnormality on the basis of the analysis order information 422 stored in the analysis order storing unit 412.

For example, in time period 2 shown in FIG. 12, the correlation destruction detection unit 301 carries out the correlation destruction detection and calculates the degree of abnormality, in the order of the system identifiers S1, S3, S4 and S2 respectively, according to the updated analysis order information 422 shown in FIG. 14, for performance information d12, d32, d42 and d22 of time period 2 measured in respective analyzed system 100.

As mentioned above, the detection order is updated in such a way that the correlation destruction detection for the analyzed systems with the system identifiers S3 and S4 having the higher evaluation score on the degree of abnormality is carried out preferentially before the correlation destruction detection for the analyzed system with the system identifiers S2 having the lower evaluation score on the degree of abnormality.

With that, the operation according to the first exemplary embodiment of the present invention is completed.

While the analysis order determination unit 401 calculates the scores on the basis of the order of the degree of correlation destruction and the order of the degree of signaling fault which are corresponding to the degree of abnormality, and determines the detection order on the basis of the total score according to the first exemplary embodiment of the present invention, another method may be used as far as the detection order is determined on the basis of largeness of the degree of abnormality. For example, the analysis order determination unit 401 may determine the detection order on the basis of an order of a total value of the degree of correlation destruction and the degree of signaling fault.

Moreover, the analysis order determination unit 401 may use any one of the degree of correlation destruction and the degree of signaling fault as the degree of abnormality. Moreover, the analysis order determination unit 401 may use another index calculated on the basis of the result of the correlation destruction detection as the degree of abnormality, in addition to the degree of correlation destruction and the degree of signaling fault.

Figure 1:
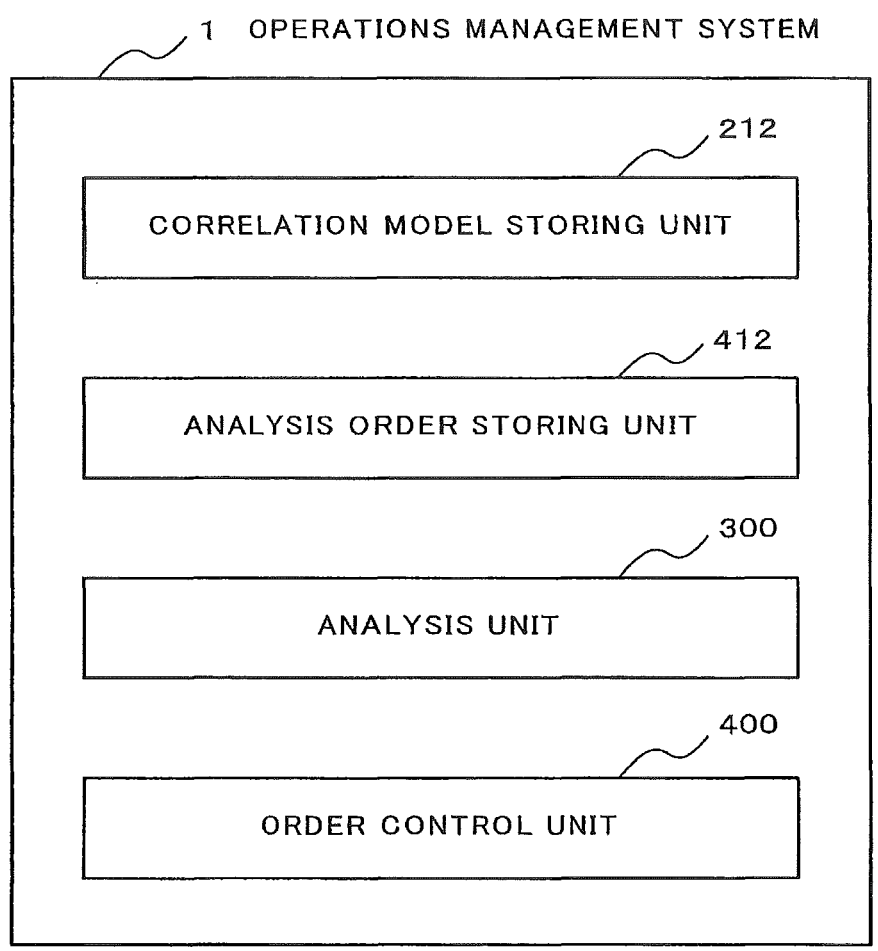
FIG. 1 A block diagram showing a typical configuration of a first exemplary embodiment of the present invention.

Next, a characteristic configuration of the first exemplary embodiment of the present invention will be described. FIG. 1 is a block diagram showing a characteristic configuration according to the first exemplary embodiment of the present invention.

Referring to FIG. 1, an operations management system 1 includes a correlation model storing unit 212, an analysis order storing unit 412, an analysis unit 300, and an order control unit 400.

The correlation model storing unit 212 stores a correlation model 222 which indicates a correlation among plural types of performance values, for each of plural systems.

The analysis order storing unit 412 stores a detection order in the plural systems for carrying out detection of correlation destruction.

The analysis unit 300 carries out, in each of plural time periods, detection of whether the correlation destruction of the correlation included in the correlation model of each of the plural systems is caused or not by use of performance values inputted for the each of plural time periods, on the basis of the detection order.

The order control unit 400 updates the detection order in the each of plural time periods.

According to the first exemplary embodiment of the present invention, it is possible to decrease a delay in detecting the fault, in the invariant analysis applied to a plurality of the analyzed systems 100. The reason is that the order control unit 400 updates the detection order in each of the plural time periods.

Moreover, according to the first exemplary embodiment of the present invention, it is possible to carry out detection of the fault for the analyzed system 100 having a high possibility that the fault is caused at this moment or will be caused in the future, preferentially. The reason is that the order control unit 400 determines the detection order by use of the degree of abnormality which is derived from at least one of the degree of correlation destruction calculated on the basis of the number of the correlations on which the correlation destruction has been detected, and the degree of similarity between the result of the correlation destruction detection at a time when the analyzed system 100 was in a state of the fault and the result of the correlation destruction detection for the inputted performance values.

Moreover, according to the first exemplary embodiment of the present invention, it is possible to decrease the delay in detecting the fault regardless of a scale of the analyzed system 100. The reason is that the order control unit 400 uses, as the degree of abnormality, a combination of the degree of correlation destruction which has a tendency to become large as the number of correlations included in the correlation model 422 becomes large, and the degree of similarity between the results of the correlation destruction detection which has a tendency to become large as the number of correlations included in the correlation model 422 becomes small.

(Second Exemplary Embodiment)

Next, a second exemplary embodiment of the present invention will be described.

In the second exemplary embodiment of the present invention, it is assumed that it is not always possible to carry out (complete) the correlation destruction detection for all the analyzed systems 100 within each time period.

For example, in the case that the number of the analyzed systems 100 is large, and the time interval at which the performance information is collected is shorter than a time required for carrying out the correlation destruction detection for all analyzed systems 100, it is impossible to carry out the correlation destruction detection for the analyzed system 100 whose detection order is scheduled latterly, within each time period. Moreover, in the case that the analysis unit 300 has to carry out a process, whose processing time is time-variant, in addition to the correlation destruction detection, it is impossible to carry out the correlation destruction detection for the analyzed system 100 whose detection order is scheduled latterly, in some time periods.

In this case, since the degree of abnormality is not updated for the analyzed system 100 for which the correlation destruction detection is not carried out in the configuration according to the first exemplary embodiment of the present invention, there is a problem that a state, in which the correlation destruction detection is not carried out for the analyzed system 100, continues.

Then, in the second exemplary embodiment of the present invention, a value larger than the degree of abnormality calculated in a former time period in which the correlation destruction detection was carried out is assigned to the degree of abnormality of the analyzed system 100 for which the correlation destruction detection has not been carried out. By this, it is possible to carry out the correlation destruction detection for the analyzed system 100 in preference to another analyzed system 100 in the next time period.

Note that, in the second exemplary embodiment of the present invention, a component with the same reference sign as the component of the first exemplary embodiment of the present invention is identical to the component of the first exemplary embodiment, as far as there is no specific description.

Figure 15:
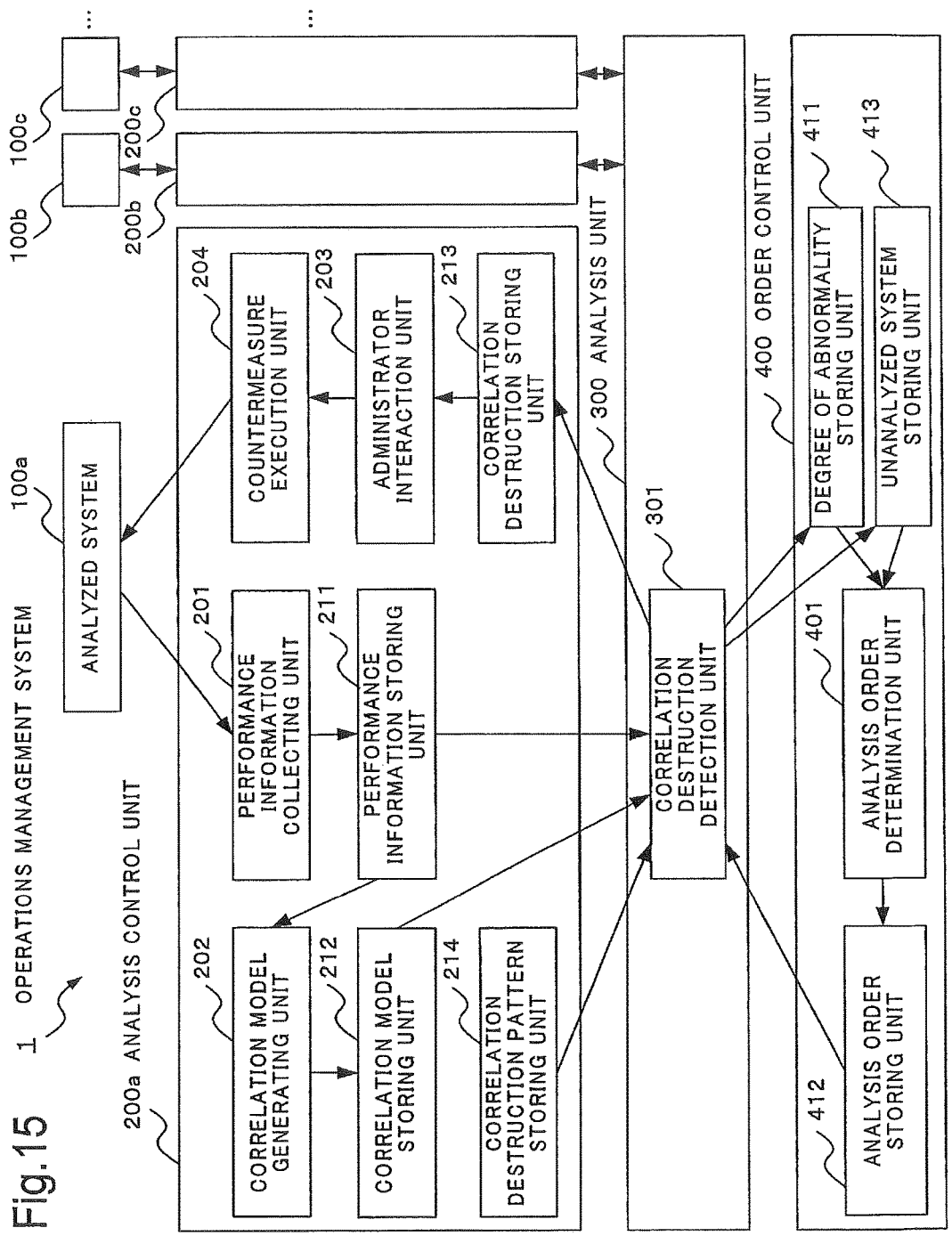
FIG. 15 A block diagram showing a configuration of an operations management system 1 according to a second exemplary embodiment of the present invention.

Firstly, a configuration according to the second exemplary embodiment of the present invention will be described. FIG. 15 is a block diagram showing a configuration of an operations management system 1 according to the second exemplary embodiment of the present invention.

With reference to FIG. 15, the order control unit 400 of the operations management system 1 according to the second exemplary embodiment of the present invention includes an unanalyzed system storing unit 413 in addition to the configuration according to the first exemplary embodiment of the present invention.

The unanalyzed system storing unit 413 stores unanalyzed system information 423 which indicates the analyzed system 100 for which the correlation destruction detection has not been carried out (unanalyzed) in each of the plural time periods mentioned above.

Figure 17:
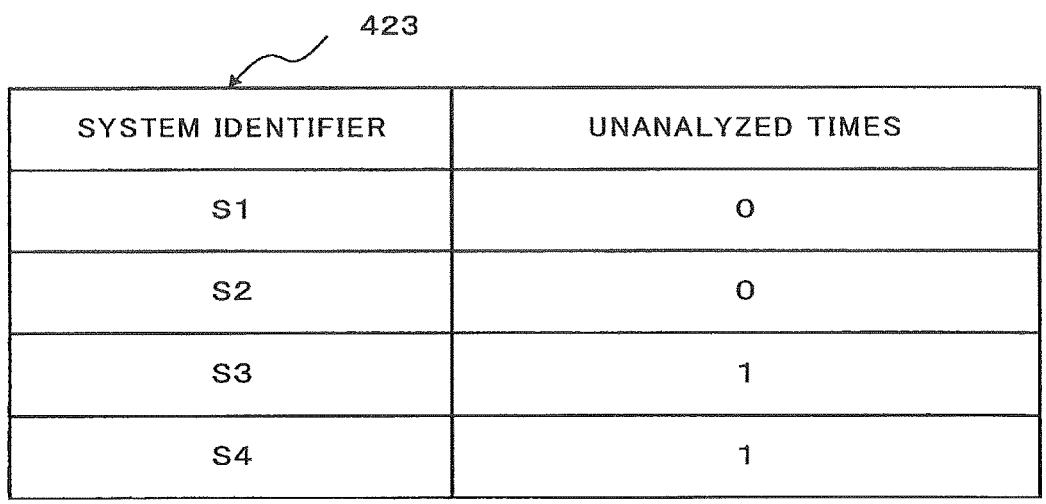
FIG. 17 A diagram showing an example of unanalyzed system information 423 according to the second exemplary embodiment of the present invention.

FIG. 17 is a diagram showing an example of the unanalyzed system information 423 according to the second exemplary embodiment of the present invention. As shown in FIG. 17, the unanalyzed system information 423 includes a list of sets of the system identifier of the analyzed system 100 and unanalyzed times which indicates the number of times the correlation destruction detection was not carried out for the analyzed system 100. The unanalyzed times is 0 in an initial state. In the case that the correlation destruction detection has been carried out, the unanalyzed times is reset to 0.

The correlation destruction detection unit 301 of the analysis unit 300 carries out the correlation destruction detection in each analyzed system 100, sequentially, on the basis of the detection order which is indicated by the analysis order information 422 acquired from the order control unit 400, in each of the plural time periods. According to the second exemplary embodiment of the present invention, the correlation destruction detection unit 301 carries out the correlation destruction detection not only for the performance information of the present time period but also for the performance information of the former time period in which the correlation destruction detection was not carried out, collectively.

The analysis order determination unit 401 of the order control unit 400 determines the order of carrying out the correlation destruction detection in a plurality of the analyzed systems 100 on the basis of the degree of abnormality of each analyzed system 100, which is stored in the degree of abnormality storing unit 411, in each of the plural time periods mentioned above. According to the second exemplary embodiment of the present invention, the analysis order determination unit 401 assigns a value larger than the degree of abnormality calculated in the former time period, in which the correlation destruction detection was carried out, to the degree of abnormality of the analyzed system 100 for which the correlation destruction detection has not been carried out, and determines the order of carrying out the correlation destruction detection on the basis of the degree of abnormality to which the value is assigned. Specifically, the analysis order determination unit 401 determines the order of carrying out the correlation destruction detection using a value obtained through multiplying the degree of abnormality calculated in the time period when the correlation destruction detection was carried out by the unanalyzed times.

Next, an operation of the operations management system 1 according to the second exemplary embodiment of the present invention will be described.

Figure 16:
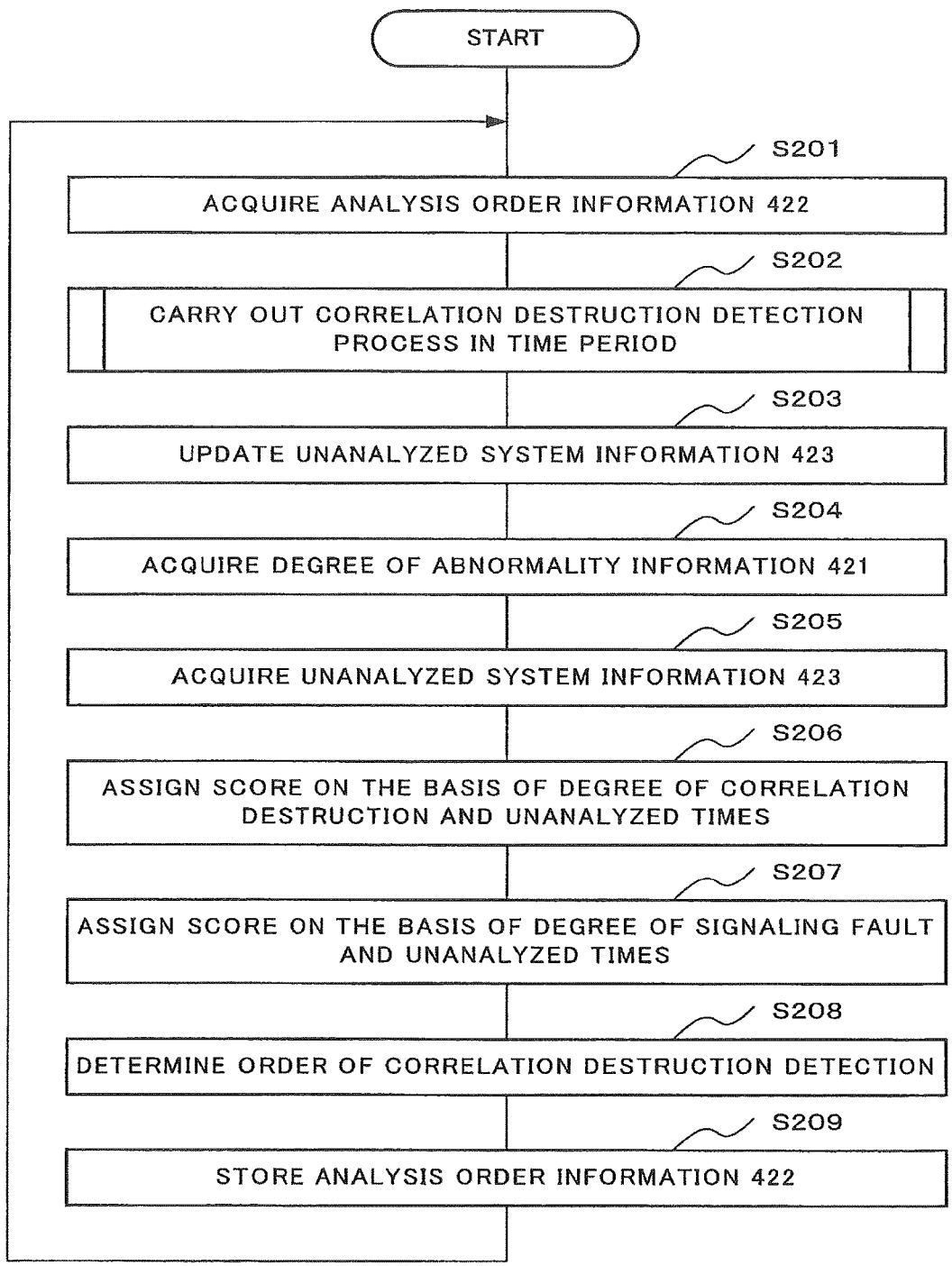
FIG. 16 A flowchart showing a process carried out by the operations management system 1 according to the second exemplary embodiment of the present invention.
Figure 18:
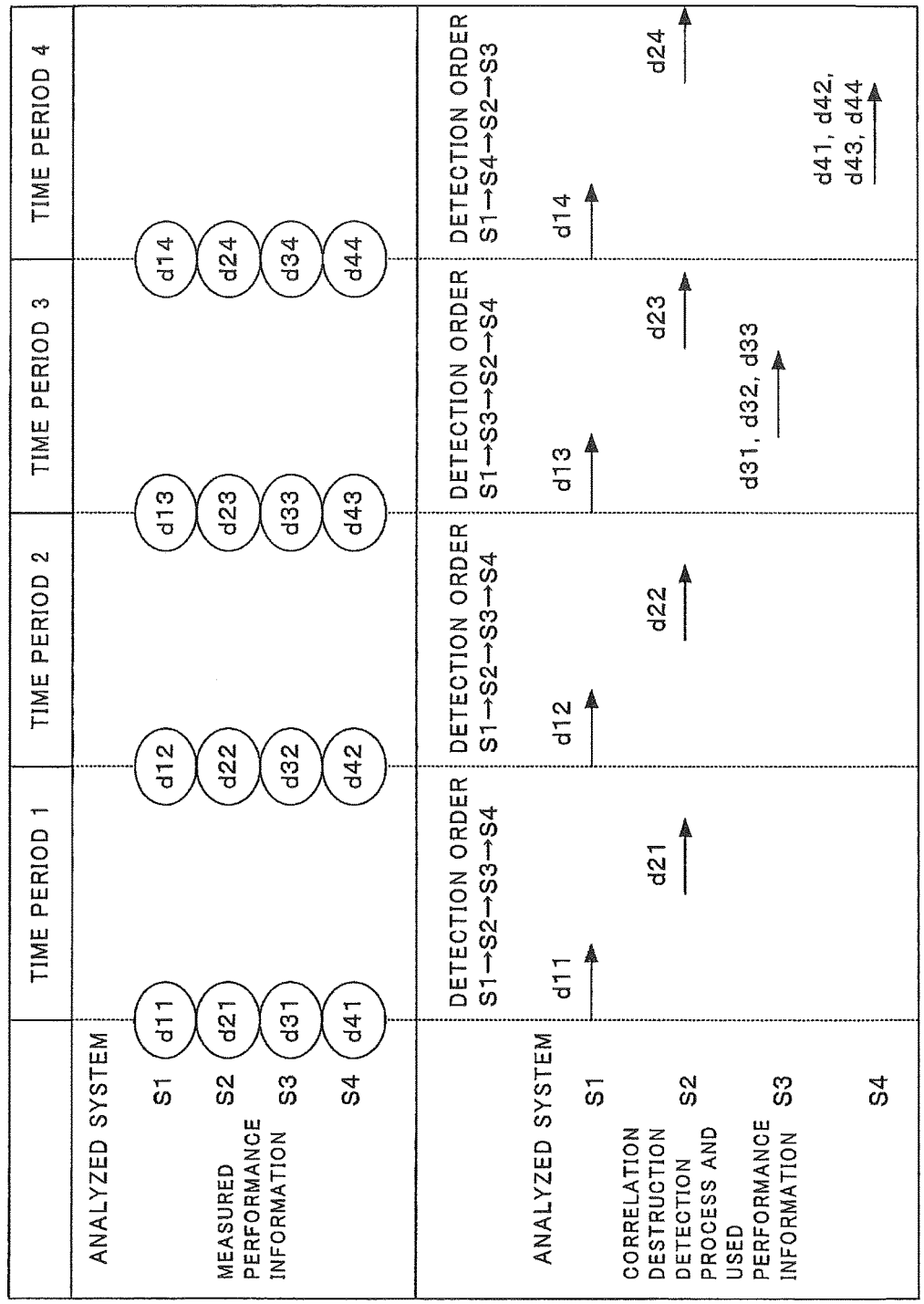
FIG. 18 A diagram showing an example of a correlation destruction detection process carried out in each time period according to the second exemplary embodiment of the present invention.

FIG. 16 is a flowchart showing a process carried out by the operations management system 1 according to the second exemplary embodiment of the present invention. FIG. 18 is a diagram showing an example of a correlation destruction detecting process carried out in each time period according to the second exemplary embodiment of the present invention.

Firstly, in each of the plural time periods mentioned above, the correlation destruction detection unit 301 of the analysis unit 300 acquires analysis order information 422 from the analysis order storing unit 412 of the order control unit 400 (Step S201).

For example, the correlation destruction detection unit 301 acquires analysis order information 422 shown in FIG. 11 in time period 1 shown in FIG. 18.

The correlation destruction detection unit 301 carries out the correlation destruction detection process on the basis of the acquired analysis order information 422 (Step S202).

Here, the correlation destruction detection unit 301 carries out the correlation destruction detection process shown as Step S151 to Step S157 shown in FIG. 4, for each analyzed system 100, sequentially, according to the analysis order storing unit 412.

However, the correlation destruction detection unit 301 stops the process at a time when the time period is expired, even if the correlation destruction detection process is not completed for some analyzed systems 100.

In Step S152, in the case that the unanalyzed times of the analyzed system 100 is equal to or greater than 1 with reference to the unanalyzed system information 423, that is, in the case that the correlation destruction detection is not carried out for the analyzed system 100 in the former time period, the correlation destruction detection unit 301 acquires not only the performance information of the present time period but also the performance information of the former time period in which the correlation destruction detection was not carried out, collectively. In Step S154, the correlation destruction detection unit 301 carries out the correlation destruction detection for the performance information of the former time period in which the correlation destruction detection was not carried out and the performance information of the present time period, collectively.

In Step S155, the correlation destruction detection unit 301 stores the result of the correlation destruction detection for the time period in which the correlation destruction detection was not carried out and the result of the correlation destruction detection for the present time period in the correlation destruction storing unit 213, collectively.

Next, the correlation destruction detection unit 301 updates the unanalyzed system information 423 stored in the unanalyzed system storing unit 413 (Step S203). Here, the correlation destruction detection unit 301 adds 1 to the unanalyzed times for the analyzed system 100 for which the correlation destruction detection process has not been completed in the time period, and sets 0 to the unanalyzed times for the analyzed system 100 for which the correlation destruction detection process has been completed in the time period.

Each of FIG. 19, FIG. 20 and FIG. 21 is a diagram showing an example of calculating the detection order according to the second exemplary embodiment of the present invention.

For example, in time period 1 shown in FIG. 18, the correlation destruction detection unit 301 carries out the correlation destruction detection and calculates the degree of abnormality in an order of the system identifiers S1, S2, S3 and S4 respectively, according to the analysis order information 422 shown in FIG. 11.

Here, in the case that the correlation destruction detection process has not been carried out for the analyzed systems 100 with the system identifiers S3 and S4, the correlation destruction detection unit 301 adds 1 to the unanalyzed times of the analyzed systems 100 with the system identifier S4 and S3 respectively, and sets 0 to the unanalyzed times of the other analyzed systems 100, as shown in FIG. 19.

In the correlation destruction detection process carried out for the analyzed systems 100 with the system identifier S1 and S2, the correlation destruction detection unit 301 carries out the correlation destruction detection for the performance information d11 and d21 of time period 1 measured in the analyzed systems 100, respectively. The correlation destruction detection unit 301 calculates the degree of abnormality of the analyzed systems 100 with the system identifiers S1 and S2 respectively, as shown in FIG. 19.

Next, the analysis order determination unit 401 of the order control unit 400 acquires the degree of abnormality information 421 from the degree of abnormality storing unit 411 (Step S204). The analysis order determination unit 401 acquires the unanalyzed system information 423 from the unanalyzed system storing unit 413 (Step S205).

The analysis order determination unit 401 assigns a score to each analyzed system 100 on the basis of the degree of correlation destruction included in the degree of abnormality information 421 and the unanalyzed times included in the unanalyzed system storing unit 413 (Step S206). The analysis order determination unit 401 assigns a score to each analyzed system 100 on the basis of the degree of signaling fault included in the degree of abnormality information 421 and the unanalyzed times included in the unanalyzed system storing unit 413 (Step S207). Here, for the analyzed system 100 having unanalyzed times which is equal to or greater than 1, the analysis order determination unit 401 calculates values through multiplying the degree of correlation and the degree of signaling fault included in the degree of abnormality information 421 by the unanalyzed times respectively, and assigns scores using the calculated values similarly to the first exemplary embodiment.

For example, as shown in FIG. 19, the analysis order determination unit 401 assigns the scores after multiplying the degree of correlation destruction and the degree of signaling fault of the analyzed systems with the system identifiers S3 and S4 by 1, respectively.

Next, the analysis order determination unit 401 determines the order of carrying out the correlation destruction detection in the plural analyzed systems 100 on the basis of the total score (Step S208). Then, the analysis order determination unit 401 stores the determined detection order as the analysis order information 422 in the analysis order storing unit 412 (Step S209).

For example, as shown in FIG. 19, the analysis order determination unit 401 calculates a total score per the analyzed system 100, and determines the detection order for the analyzed systems 100 with the system identifiers S1, S2, S3 and S4 as 1, 2, 3, and 4, respectively, in an order of largeness of the total score.

Then, the correlation destruction detection unit 301 and the analysis order determination unit 401 carry out Steps S201 to S209 repeatedly in each of the plural time periods.

For example, in time period 2 shown in FIG. 18, the correlation destruction detection unit 301 carries out the correlation destruction detection and calculates the degree of abnormality in an order of the system identifiers S1, S2, S3 and S4, respectively.

Here, in the case that the correlation destruction detection process has not been carried out for the analyzed systems with the system identifiers S3 and S4, the correlation destruction detection unit 301 adds 1 to the unanalyzed times of the analyzed systems 100 with the system identifiers S3 and S4 respectively, and sets 0 to the unanalyzed times of the other analyzed systems 100, as shown in FIG. 20.

In the correlation destruction detection process carried out for the analyzed systems 100 with the system identifier S1 and S2, the correlation destruction detection unit 301 carries out the correlation destruction detection for the performance information d12 and d22 of time period 2 measured in the analyzed systems 100, respectively. The correlation destruction detection unit 301 calculates the degree of abnormality of the analyzed systems 100 with the system identifiers S1 and S2 respectively, as shown in FIG. 20.

As shown in FIG. 20, the analysis order determination unit 401 assigns the scores after multiplying the degree of correlation destruction and the degree of signaling fault of the analyzed systems with the system identifiers S3 and S4 by 2, respectively. The analysis order determination unit 401 determines the detection order for the analyzed systems 100 with the system identifiers S1, S2, S3 and S4 as 1, 3, 2, and 4, respectively, on the basis of the total score.

Then, in time period 3 shown in FIG. 18, the correlation destruction detection unit 301 carries out the correlation destruction detection and calculates the degree of abnormality in an order of the system identifiers S1, S3, S2 and S4, respectively.

Here, in the case that the correlation destruction detection process has not been carried out for the analyzed system with the system identifier S4, the correlation destruction detection unit 301 adds 1 to the unanalyzed times of the analyzed system 100 with the system identifier S4, and sets 0 to the unanalyzed times of the other analyzed systems 100, as shown in FIG. 21.

In the correlation destruction detection process carried out for the analyzed systems 100 with the system identifier S1 and S2, the correlation destruction detection unit 301 carries out the correlation destruction detection for the performance information d13 and d23 of time period 3 measured in the analyzed systems 100, respectively. In the correlation destruction detection process carried out for the analyzed system 100 with the system identifier S3, the correlation destruction detection unit 301 carries out the correlation destruction detection for the performance information d31, d32 and d33 of time period 1, 2 and 3 measured in the analyzed system 100. The correlation destruction detection unit 301 calculates the degree of abnormality of the analyzed systems 100 with the system identifiers S1, S3 and S2 respectively, as shown in FIG. 21.

As shown in FIG. 21, the analysis order determination unit 401 assigns the scores after multiplying the degree of correlation destruction and the degree of signaling fault of the analyzed system with the system identifier S4 by 3. The analysis order determination unit 401 determines the detection order for the analyzed systems 100 with the system identifiers S1, S2, S3 and S4 as 1, 3, 4, and 2, respectively, on the basis of a total score.

Then, in time period 4 shown in FIG. 18, the correlation destruction detection unit 301 carries out the correlation destruction detection and calculates the degree of abnormality in an order of the system identifiers S1, S4, S2 and S3 respectively.

As mentioned above, the detection order is updated in such a way that the correlation destruction detection for the analyzed systems with the system identifiers S3 and S4, which has not been carried out in time period 1, is carried out preferentially in time period 2 or thereafter.

Moreover, regarding the analyzed system 100 with the system identifier S3, for which the correlation destruction detection has not been carried out in time periods 1 and 2, the correlation destruction detection for the performance information of time periods 1, 2 and 3 is carried out collectively in time period 3.

As mentioned above, the correlation destruction detection process, which is carried out by the analysis unit 300, is divided into three sub-processes, (a) acquiring the performance information and the correlation model 222 from the analysis control unit 200 (Steps S152 and S153), (b) carrying out the correlation destruction detection (Step S154), and (c) storing the result of the correlation destruction detection in the analysis control unit 200 (Step S155).

Here, regarding a process time of (a) and (c), a time required for reading and writing control for accessing a storage apparatus or the like is longer than a time required for transferring data. Therefore it is appropriate to think that a process time of (a) and (c) required in the case of acquiring and storing the performance information of a plurality of time periods collectively, is almost equal to a process time of (a) and (c) required in the case of acquiring and storing the performance information of one time period. Moreover, it is appropriate to think that a process time of (b), which does not include a time for accessing the storage apparatus or the like, is quite small in comparison with the process time of (a) and (c). In this case, a process time for the correlation destruction detection for a plurality of the time periods is almost equal to one for one time period.

Accordingly, it is possible to decrease a load of the correlation destruction detection process through carrying out the correlation destruction detection for a plurality of periods, collectively.

With this, the operation according to the second exemplary embodiment of the present invention is completed.

While the analysis order determination unit 401 determines the order of the correlation destruction detection using the value obtained through multiplying the degree of abnormality calculated in the time period when the correlation destruction detection was carried out by the unanalyzed times, in the second exemplary embodiment of the present invention, another method may be used, as far as it is possible to use a value which is larger than the degree of abnormality calculated in the time period when the correlation destruction detection was carried out as the degree of abnormality. For example, the analysis order determination unit 401 may multiply the degree of abnormality calculated in the time period when the correlation destruction detection was carried out by a predetermined constant. Moreover, the analysis order determination unit 401 may multiply the degree of abnormality calculated in the time period when the correlation destruction detection was carried out by another coefficient which becomes large according to the unanalyzed times.

According to the second exemplary embodiment of the present invention, even if there is an analyzed system 100 for which the correlation destruction detection has not been carried out within a time period for the analysis because of the late detection order, it is possible to carry out the correlation destruction detection for the analyzed system 100 in the latter time period. The reason is that the analysis order determination unit 401 assigns the value larger than the degree of abnormality calculated in the former time period in which the correlation destruction detection was carried out, to the degree of abnormality of the analyzed system 100 for which the correlation destruction detection has not been carried out, and determines the order of the correlation destruction detection on the basis of the assigned degree of abnormality.

Moreover, according to the second exemplary embodiment of the present invention, it is possible to decrease a load of the correlation destruction detection process. The reason is that the correlation destruction detection unit 301 carries out the correlation destruction detection not only for the performance information of the present time period but also for the performance information of the former time period in which the correlation destruction detection was not carried out, collectively.

Moreover, according to the second exemplary embodiment of the present invention, it is possible to decrease a load of the correlation destruction detection process with carrying out preferentially the detection of the fault of the analyzed system 100 having a high possibility that the fault is caused at this moment or will be caused in the future. The reason is that the correlation destruction detection for the analyzed system 100 having the large degree of abnormality is carried out in each time period, preferentially, and the correlation destruction detection for the analyzed system 100 having the small degree of abnormality is carried out for the performance information of the plural time periods, collectively.

(Third Exemplary Embodiment)

Next, a third exemplary embodiment of the present invention will be described.

In the third exemplary embodiment of the present invention, the analysis order determination unit 401 sets a group of the plural analyzed systems 100, for which the correlation destruction detection has not been carried out, having the large unanalyzed times, in stead of multiplying the degree of abnormality calculated in the time period in which the correlation destruction detection was carried out by the unanalyzed times. The analysis order determination unit 401 assigns a total of the degrees of abnormality, each of which is calculated in the time period in which the correlation destruction detection was carried out for corresponding one of the plural analyzed systems 100 included in the group, to the degree of abnormality of each analyzed system 100 included in the group, and determines the order of the correlation destruction detection on the basis of the assigned degree of abnormality.

A configuration of the third exemplary embodiment of the present invention is similar to one according to the second exemplary embodiment of the present invention (FIG. 15).

Next, an operation of an operations management system 1 according to the third exemplary embodiment of the present invention will be described. A flowchart, which shows a process carried out by the operations management system 1 according to the third exemplary embodiment of the present invention, is similar to one according to the second exemplary embodiment of the present invention (FIG. 16).

Figure 22:
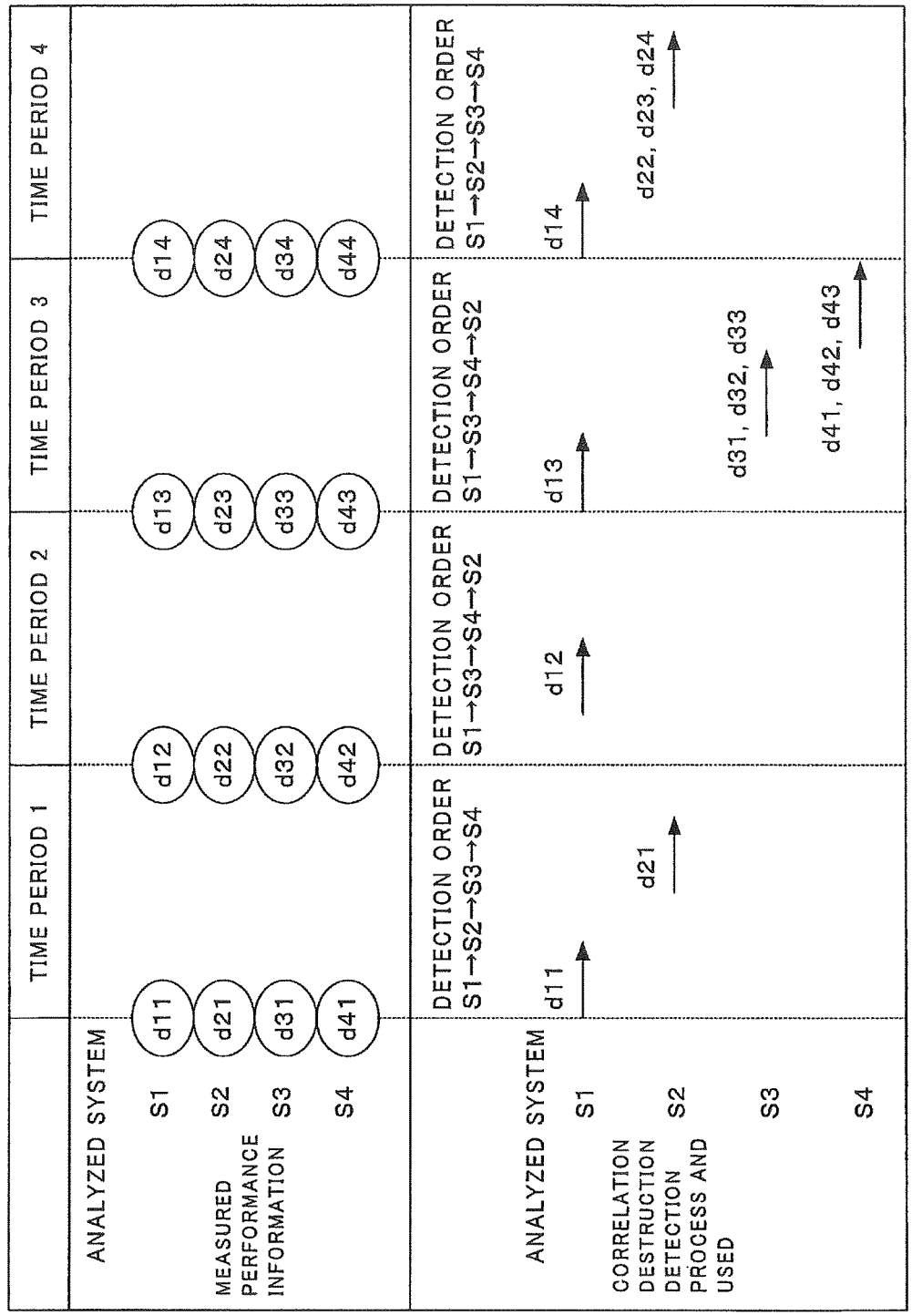
FIG. 22 A diagram showing an example of a correlation destruction detection process carried out in each time period according to a third exemplary embodiment of the present invention.

FIG. 22 is a diagram showing an example of a correlation destruction detection process carried out in each time period according to the third second exemplary embodiment of the present invention. Each of FIG. 23, FIG. 24 and FIG. 25 is a diagram showing an example of calculating a detection order according to the third exemplary embodiment of the present invention.

For example, in time period 1 shown in FIG. 22, the correlation destruction detection unit 301 carries out the correlation destruction detection and calculates the degree of abnormality in an order of the system identifiers S1, S2, S3 and S4 respectively, according to the analysis order information 422 shown in FIG. 11.

Here, in the case that the correlation destruction detection process has not been carried out for the analyzed systems 100 with the system identifiers S3 and S4, the correlation destruction detection unit 301 adds 1 to the unanalyzed times of the analyzed systems 100 with the system identifiers S3 and S4 and sets 0 to the unanalyzed times of the other analyzed systems, as shown in FIG. 23.

In the correlation destruction detection process carried out for the analyzed systems 100 with the system identifiers S1 and S2, the correlation destruction detection unit 301 carries out the correlation destruction detection for the performance information d11 and d21 of time period 1 measured in the analyzed systems 100, respectively. The correlation destruction detection unit 301 calculates the degree of abnormality of the analyzed systems 100 with the system identifier S1 and S2 respectively, as shown in FIG. 23.

Here, it is assumed, as a condition of setting the group, that a predetermined number of the analyzed systems 100 having the largest value of unanalyzed times from the analyzed systems 100 for which the correlation destruction detection has not been carried out are included in a group, for example. Moreover, it is assumed that the predetermined number is 2.

In this case, as shown in FIG. 23, the analysis order determination unit 401 sets a group of the analyzed systems 100 with the system identifiers S3 and S4 whose unanalyzed times is 1. The analysis order determination unit 401 assigns a value obtained through adding the degrees of correlation destruction of the analyzed systems 100 with the system identifiers S3 and S4 to the degree of correlation destruction of the analyzed systems 100 with the system identifiers S3 and S4. Moreover, the analysis order determination unit 401 assigns a value obtained through adding the degrees of signaling fault of the analyzed systems 100 with the system identifiers S3 and S4 to the degree of signaling fault of the analyzed systems 100 with the system identifiers S3 and S4. Then, the analysis order determination unit 401 calculates scores and a total score.

The analysis order determination unit 401 determines the detection order for the analyzed systems 100 with the system identifiers S1, S2, S3 and S4 as 1, 4, 2, and 3, respectively, on the basis of the total score. Note that, the detection order of the analyzed system 100 within the group is determined in such a way that the correlation destruction detection may be carried out early for the analyzed system 100 which has the large degree of abnormality or the large degree of signaling fault.

Then, in time period 2 shown in FIG. 22, the correlation destruction detection unit 301 carries out the correlation destruction detection and calculates the degree of abnormality in the order of the system identifiers S1, S3, S4 and S2 respectively.

Here, in the case that the correlation destruction detection process has not been carried out for the analyzed systems with the system identifiers S3, S4 and S2, the correlation destruction detection unit 301 add 1 to the unanalyzed times of the analyzed systems 100 with the system identifier S3, S4 and S2, and sets 0 to the unanalyzed times of the other analyzed systems, as shown in FIG. 24.

In the correlation destruction detection process carried out for the analyzed system 100 with the system identifier S1, the correlation destruction detection unit 301 carries out the correlation destruction detection for the performance information d12 of time period 2 measured in the analyzed system 100. The correlation destruction detection unit 301 calculates the degree of abnormality of the analyzed system 100 with the system identifier S1, as shown in FIG. 24.

As shown in FIG. 24, the analysis order determination unit 401 sets a group of the analyzed systems 100 with the system identifiers S3 and S4 whose unanalyzed times is 2, and assigns scores. The analysis order determination unit 401 determines the detection order for the analyzed systems 100 with the system identifiers S1, S2, S3 and S4 as 1, 4, 2, and 3, respectively, on the basis of the total score.

Then, in time period 3 shown in FIG. 22, the correlation destruction detection unit 301 carries out the correlation destruction detection and calculates the degree of abnormality in the order of the system identifiers S1, S3, S4 and S2, respectively.

Here, in the case that the correlation destruction detection process has not been carried out for the analyzed system 100 with the system identifier S2, the correlation destruction detection unit 301 adds 1 to the unanalyzed times of the analyzed system 100 with the system identifier S2, and sets 0 to the unanalyzed times of the other analyzed systems 100, as shown in FIG. 25

In the correlation destruction detection process carried out for the analyzed system 100 with the system identifier S1, the correlation destruction detection unit 301 carries out the correlation destruction detection and calculates the degree of abnormality for the performance information d13 of time period 3 measured in the analyzed system 100. In the correlation destruction detection process carried out for the analyzed systems 100 with the system identifiers S3 and S4, the correlation destruction detection unit 301 carries out the correlation destruction detection and calculates the degree of abnormality for the performance information d31, d32 and d33, and d41, d42 and d43 of time period 4 measured in the analyzed systems 100. The correlation destruction detection unit 301 calculates the degree of abnormality of the analyzed systems 100 with the system identifiers S1, S3 and S4 respectively, as shown in FIG. 25.

As shown in FIG. 25, the analysis order determination unit 401 assigns scores, and determines the detection order for the analyzed systems 100 with the system identifiers S1, S2, S3 and S4 as 1, 2, 3, and 4, respectively, on the basis of a total score.

As mentioned above, the detection order is updated in such a way that the correlation destruction detection, which has not been carried out in time period 1 for the analyzed systems with the system identifiers S3 and S4, is carried out preferentially in time period 2 or thereafter.

With this, the operation according to the third exemplary embodiment of the present invention is completed.

While the analysis order determination unit 401 sets the group which includes the predetermined number of the analyzed systems 100 having the largest value of the unanalyzed time from the analyzed systems 100 for which the correlation destruction detection has not been carried out, in the third exemplary embodiment of the present invention, another method may be used, as far as it is possible to set a group of the analyzed systems having the large value of the unanalyzed times. For example, the analysis order determination unit 401 may set a group of the analyzed systems whose unanalyzed times is equal to or greater than a predetermined value.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, when the analysis unit 300 determines the detection order, the analysis unit 300 may use both of the method using the value obtained through multiplying the degree of abnormality by the predetermined coefficient according to the second exemplary embodiment of the present invention, and the method using a total of the degrees of abnormality through setting a group of the analyzed systems 100 according to the third exemplary embodiment of the present invention.

This application is based upon and claims the benefit of priority from Japanese Patent Application No. 2011-064603, filed on Mar. 23, 2011, the disclosure of which is incorporated herein in its entirety by reference.

REFERENCE SIGNS LIST

1 Operations management system
100 Analyzed system
200 Analysis control unit
201 Performance information collecting unit
202 Correlation model generating unit
203 Administrator interaction unit
204 Countermeasure execution unit
211 Performance information storing unit
212 Correlation model storing unit
213 Correlation destruction storing unit
214 Correlation destruction pattern storing unit
221 Performance sequence information
222 Correlation model
223 Correlation destruction information
224 Correlation destruction pattern
300 Analysis unit
301 Correlation destruction detection unit
400 Order control unit
401 Analysis order determination unit
411 Degree of abnormality storing unit
412 Analysis order storing unit
413 Unanalyzed system storing unit
421 Degree of abnormality information
422 Analysis order information
423 Unanalyzed system information

What is claimed is:

1. An operations management system, comprising:
a memory configured to store program instructions and a plurality of analytical models respectively used for detection of anomaly in a plurality of targets; and
a processor configured to execute the program instructions including:
an order controller configured to control a processing order of the detection of anomaly for the plurality of targets performed by the operation management system to be the same as a descending order of score of anomaly of the plurality of targets;
an analyzer configured to detect, in the processing order, anomaly in each of the plurality of targets; and
a countermeasure executor configured to execute countermeasure for the anomaly on the target in which the anomaly is detected, wherein
the order controlled is configured to update the processing order for the plurality of targets, per each period of time, and
the analyzer is configured to detect anomaly for the plurality of targets, per each period of time,
wherein the order controller is configured to, in a case that the detection of anomaly has not been performed for one of the plurality of targets within a period of time, update the processing order using the score increased for the one of the plurality of targets.

2. The operations management system according to claim 1, wherein
the analytical model includes one or more correlations among plural types of performance values of the target.

3. The operations management system according to claim 2, wherein
the score of anomaly is calculated based on a result of detection of correlation destruction.

4. An operations management method, comprising:
storing a plurality of analytical models respectively used for detection of anomaly in a plurality of targets;
controlling a processing order of the detection of anomaly for the plurality of targets performed by the operation management system to be the same as a descending order of score of anomaly of the plurality of targets;
detecting, in the processing order, anomaly in each of the plurality of targets; and
executing countermeasure for the anomaly on the target in which the anomaly is detected, wherein
the controlling updates the processing order for the plurality of targets, per each period of time, and
the detecting detects anomaly for the plurality of targets, per each period of time,
wherein the controlling, in a case that the detection of anomaly has not been performed for one of the plurality of targets within a period of time, updates the processing order using the score increased for the one of the plurality of targets.

5. The operations management method according to claim 4, wherein
the analytical model includes one or more correlations among plural types of performance values of the target.

6. The operations management method according to claim 5, wherein
the score of anomaly is calculated based on a result of detection of correlation destruction.

7. A non-transitory computer readable storage medium recording thereon a program, causing a computer to perform a method comprising:

storing a plurality of analytical models respectively used for detection of anomaly in a plurality of targets:

controlling a processing order of the detection of anomaly for the plurality of targets performed by the operation management system to be the same as a descending order of score of anomaly of the plurality of targets;

detecting, in the processing order, anomaly in each of the plurality of targets; and executing countermeasure for the anomaly on the target in which the anomaly is detected, wherein the controlling updates the processing order for the plurality of targets, per each period of time, and the detecting detects anomaly for the plurality of targets, per each period of time, wherein the controlling, in a case that the detection of anomaly has not been performed for one of the plurality of targets within a period of time, updates the processing order using the score increased for the one of the plurality of targets.

8. The non-transitory computer readable storage medium according to claim 7, recording thereon the program causing the computer to perform the method, wherein the analytical model includes one or more correlations among plural types of performance values of the target.

9. The non-transitory computer readable storage medium according to claim 8, recording thereon the program causing the computer to perform the method, wherein, the score of anomaly is calculated based on a result of detection of correlation destruction.

10. An operations management system, comprising:
an order controller; and
an analyzer, wherein the order controller includes;
  a memory storing instructions, and
  one or more processors configured to execute the instructions to:
  determine a processing order of detection of anomaly in each of a plurality of targets to be the same as a descending order of score of anomaly of the plurality of targets, and
  output the processing order to the analyzer, the analyzer includes:
  memory storing instructions and a plurality of analytical models respectively used for detection of anomaly in the plurality of targets, and
  one or more processors configured to execute the instructions to:
  detect, in the processing order, anomaly in each of the plurality of targets, wherein the determining updates the processing order for the plurality of targets, per each period of time, and the detecting detects anomaly for the plurality of targets, per each period of time, wherein the order controller is configured to, in a case that the detection of anomaly has not been performed for one of the plurality of targets within a period of time, update the processing order using the score increased for the one of the plurality of targets.

11. The operations management system according to claim 10, further comprising a countermeasure executor configured to execute countermeasure for the anomaly on the target in which the anomaly is detected.

* * * * *

UNITED STATES PATENT AND TRADEMARK OFFICE
CERTIFICATE OF CORRECTION

| | | |
|---|---|---|
| PATENT NO. | : 10,430,268 B2 | Page 1 of 1 |
| APPLICATION NO. | : 15/208457 | |
| DATED | : October 1, 2019 | |
| INVENTOR(S) | : Yosuke Nonogaki | |

It is certified that error appears in the above-identified patent and that said Letters Patent is hereby corrected as shown below:

On the Title Page

(73) Assignee: from "NEC Display Solutions, Ltd.", to "NEC Corporation"

Signed and Sealed this
Twenty-eighth Day of April, 2020

Andrei Iancu
*Director of the United States Patent and Trademark Office*